(12) United States Patent
Munjal et al.

(10) Patent No.: US 10,580,058 B2
(45) Date of Patent: Mar. 3, 2020

(54) METHODS AND SYSTEMS FOR PROVIDING PERSONAL SHOPPING SERVICES

(71) Applicant: TRANSFORM SR BRANDS LLC, Hoffman Estates, IL (US)

(72) Inventors: Leena Munjal, Algonquin, IL (US); Eddie Lampert, Greenwich, CT (US); Eric Jaffe, Greenwich, CT (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

(21) Appl. No.: 16/005,944

(22) Filed: Jun. 12, 2018

(65) Prior Publication Data
US 2018/0357704 A1 Dec. 13, 2018

Related U.S. Application Data

(63) Continuation of application No. 15/084,001, filed on Mar. 29, 2016, now Pat. No. 9,996,869, which is a continuation of application No. 13/409,678, filed on Mar. 1, 2012, now abandoned.

(51) Int. Cl.
*G06Q 30/00* (2012.01)
*G06Q 30/06* (2012.01)
*G06Q 30/02* (2012.01)

(52) U.S. Cl.
CPC ......... *G06Q 30/0631* (2013.01); *G06Q 30/02* (2013.01); *G06Q 30/0214* (2013.01); *G06Q 30/06* (2013.01); *G06Q 30/0613* (2013.01)

(58) Field of Classification Search
None
See application file for complete search history.

(56) References Cited

U.S. PATENT DOCUMENTS

| | | | |
|---|---|---|---|
| 6,236,978 B1 | 5/2001 | Tuzhilin | |
| 7,136,829 B2 | 11/2006 | Hellal et al. | |
| 8,739,044 B1* | 5/2014 | Varadarajan | .......... G06F 3/0481 709/204 |

(Continued)

OTHER PUBLICATIONS

"Snap. Send. Success! Sears Holding unveils personal shopper application for the iPhone mobile digital device," PRNewswire (Dec. 16, 2009).

(Continued)

*Primary Examiner* — Matthew T Sittner
(74) *Attorney, Agent, or Firm* — McAndrews, Held & Malloy, Ltd.

(57) ABSTRACT

A method and system for providing personal shopping assistance via a computing device includes hosting a database of information regarding a customer, hosting a database of information regarding a personal shopper, and associating the customer with the personal shopper. The personal shopper is provided the ability to recommend at least one of a product or a service relevant to the customer and receiving an indication of the purchase of the recommended product or service by the customer. An incentive system may provide a reward to the personal shopper based upon the purchased product or service, including a commission or other reward. The system may be implemented on a desktop and/or mobile device as desired to provide flexibility in implementation.

21 Claims, 37 Drawing Sheets

(56) References Cited

U.S. PATENT DOCUMENTS

| | | | | |
|---|---|---|---|---|
| 8,751,316 | B1* | 6/2014 | Fletchall | G07G 1/0081 705/16 |
| 2001/0044751 | A1* | 11/2001 | Pugliese, III | G06Q 30/02 705/14.1 |
| 2004/0080780 | A1* | 4/2004 | Fallon | G06Q 30/06 358/1.15 |
| 2004/0148275 | A1* | 7/2004 | Achlioptas | G06F 16/9535 |
| 2005/0097000 | A1 | 5/2005 | Freishtat | |
| 2006/0041478 | A1* | 2/2006 | Zheng | G06Q 30/02 705/14.56 |
| 2006/0085419 | A1 | 4/2006 | Rosen | |
| 2006/0270478 | A1 | 11/2006 | Barhydt | |
| 2007/0112634 | A1 | 5/2007 | Somers | |
| 2007/0186238 | A1* | 8/2007 | Schrager | G06F 3/04815 725/35 |
| 2009/0132341 | A1 | 5/2009 | Klinger | |
| 2009/0172551 | A1 | 7/2009 | Kane | |
| 2009/0259547 | A1 | 10/2009 | Clopp | |
| 2010/0274686 | A1 | 10/2010 | Graefe | |
| 2011/0022499 | A1 | 1/2011 | Hogan | |
| 2011/0258086 | A1* | 10/2011 | Stein | G06Q 30/0603 705/27.2 |
| 2012/0022937 | A1* | 1/2012 | Bhatia | G06Q 30/0241 705/14.41 |
| 2012/0130847 | A1* | 5/2012 | Kalin | G06Q 30/0631 705/26.7 |
| 2012/0130849 | A1* | 5/2012 | Katz | G06Q 30/0631 705/26.7 |
| 2012/0191515 | A1* | 7/2012 | Katz | G06Q 30/0214 705/14.16 |
| 2013/0097144 | A1* | 4/2013 | Siamwalla | G06Q 10/10 707/706 |
| 2013/0124365 | A1* | 5/2013 | Pradeep | G06Q 30/06 705/26.43 |
| 2013/0231990 | A1* | 9/2013 | Munjal | G06Q 30/06 705/14.23 |
| 2016/0284008 | A1* | 9/2016 | Munjal | G06Q 30/06 |

OTHER PUBLICATIONS

"Sears Holdings Corporation brings personalized and convenient shopping to life with ShopYourWay," PRNewswire—FirstCall (Mar. 13, 2009).
Chantal Tode, "Sears touts multichannel capabilities" (Mar. 17, 2009).
Mark Brohan, "Sears becomes a member of the exclusive mobile app club" (Apr. 22, 2009).
Magdelyn Skacan, "Fine Sears 2Go shopping app gives retailer advantage over peers." (Aug. 31, 2009).
"Sears and Kmart make Black Friday shopping easier and more convenient than ever before," PRNewswire (Nov. 24, 2009).
"Sears and Kmart give shoppers something to celebrate with unbeatable Black Friday deals," PRNewswire (Nov. 27 2009).
"Sears.com and Kmart.com help navigate shoppers to Cyber Monday deals," PRNewswire (Nov. 27, 2009).
"Update: Sears.com and Kmart.com help navigate shoppers to Cyber Monday deals," PRNewswire (Nov. 27, 2009).
"Sears Holdings ranked third in multichannel retailer web traffic," PRNewswire-FristCall (Dec. 8, 2009).
Chris Harnick, "Sears expands mobile commerce strategy with personal shopper app" (Dec. 25, 2009).
Alan Wolf, "Sears deploys live iPhone 'Personal Shopper' App" (Jan. 7, 2010).
Miguel Bustillo et al., "Sears scrambles online for a lifetime," The Wall Street Journal (Jan. 15, 2010).
Zak Stambor, "Another revamp for Sears.com," Internet Retailer (Oct. 19, 2010).
"Sears Holdings ranked third in multichannel retailer web traffic during busiest shopping weekend of the year," PR Newswire (Dec. 15, 2010).
"Site speed and convenient shopping tools make sears.com and kmart.com shopping destinations of choice this holiday season," PR Newswire (Dec. 28, 2010).
"Sears.com and kmart.com prepare for 'Green Monday' with online discounts and cyber deals," PR Newswire (Dec. 9, 2011).
Michael J. Knell, "Sears Canada launches smartphone e-commerce app," Furniture Today (Apr. 6, 2012).
Chris Harnick, "Sears expands mobile commerce strategy with personal shopper app," Mobile Commerce Daily (Dec. 25, 2009).
Chris Harnick, "Sears mobile offerings see increased usage during holiday season," Mobile Commerce Daily (Dec. 11, 2009).
PCT, Notification Concerning Transmittal of International Preliminary Report on Patentability, in Application No. PCT/US2013023563 (dated Sep. 12, 2014) (10 pages).
Canadian Intellectual Property Office, Examiner Requisition in Application No. 2,860,020, dated Dec. 14, 2015 (3 pages).
Internet Archive, Sears Holdings Press Releases, Sears Holdings Unveils Personal Shopper Application for the iPhone (R) Mobile Digital Device (archives Jan. 2, 2010).
Internet Archive, StyleOwner.com (selected pages archived Sep. 2010 to Jul. 2011).
Ty McMahan, Wall Street Journal Venture Capital Dispatch, StyleOwner Hits Runway With Eye for "Stylepreneurs". (Oct. 17, 2011).
David Moin, WWD, StyleOwner Taps Into Social Selling. (Oct. 3, 2011).
Internet Archive, Shopsocially.com (selected pages archived May 2010 to Jul. 2011).
Vissa. Too much of a good thing: Entrepreneurs' reliance on referrals and exchange relationship formation. Academy of Management Journal. Aug. 2009. Retrieved from the internet. Retrieved on [Mar. 22, 2013] <URL: http://proceedings.aom.org/content/2009/1/1.51.abstract> entire document (10 pages).
Canadian Intellectual Property Office, Requisition by Examiner in Application No. 2,860,020 dated Feb. 14, 2017 (6 pages).
https://searsholdings.com/press-releases/pr/743, Internet Archive Jan. 2, 2010 (2 pages).
Canadian Intellectual Property Office, Examiner's Requisition in Application No. 2,860,020, dated Mar. 1, 2019 (6 pages).

* cited by examiner

1. SIGN UP | 2. AGREE TO TERMS | 3. GET PAID | 4. INVITE CLIENTS | 5. TAKE THE TOUR!

CREATING A CATALOGS, STEPS 3 AND 4: COMMENTING AND SHARING WITH YOUR CLIENT.

NEW!

REFRIGERATOR OPTIONS FOR JESSICA

REFRIGERATOR OPTIONS FOR JESSICA | EDIT DETAIL>
BY ANGELA STEVENS (5 CATALOGS)

A SELECTION
TOTAL PRICE
ADD TAGS
☐ I LIKE THIS

4. ADD YOUR CLIENT UNDER "EDIT PERMISSION." THE TWO OF YOU CAN ADD COMMENTS, WHICH IS A GREAT OPPORTUNITY TO MAKE RECOMMENDATIONS.

ADD
PRODUCTS +
⊕ ADD CATALOG IMAGE
🗐 COPY
🗑 DELETE CATALOG

COMMENT ON CATALOG (1) [x]
ANGELA STEVENS, 18 MINUTES AGO
JESSICA, LET ME KNOW WHICH OF THESE IMAGE OPTIONS YOU LIKE, YOU CAN ADD COMMENT IN THIS CATALOG OR USE THE LIKE BUTTON

ITEMS IN CATALOG (5)  SHOWING ITEMS 1.5 OF 5     VIEW AS: LIST | GRID

KENMORE ELITE STAINLESS STEEL 27.5 CU.FT FRENCH-DOOR BOTTOM-FREEZER REFRIGERATOR ENERGY STAR.
***************
AVG. RATING BY YOUR NETWORK ★★★★★
AVG. RATING B OVERALL ★★★★★  ☐ REWARD

☒ REMOVE
⊕ ADD THIS
🖐 HELP ME PLEASE
👍 LIKE
🏅 RECOMMEND
☑ CATALOG OVER

ANGELA STEVENS, 1 MINUTE AGO
THIS IS A LITTLE ABOVE THE RANGE YOU SUGGESTED, BUT TAKE A LOOK- IT MAY BE WORTH IT. THE DOUBLE FREEZER DRAWER CAUGHT MY EYE, SINCE IT KNOW YOU FREEZE A LOT OF HOWERS

LG 24.7 CU FT FRENCH-DOOR BOTTOM-
FREEZER REFRIGERATOR WITH SMART COOLING

3. ONCE YOU'VE ADDED A PRODUCT TO THE CATALOG, COMMENT ON IT TO LET YOUR CLIENT KNOW WHY YOU CHOSE IT.

ooooo●oooooo  SKIP TOUR         NEXT »

1410

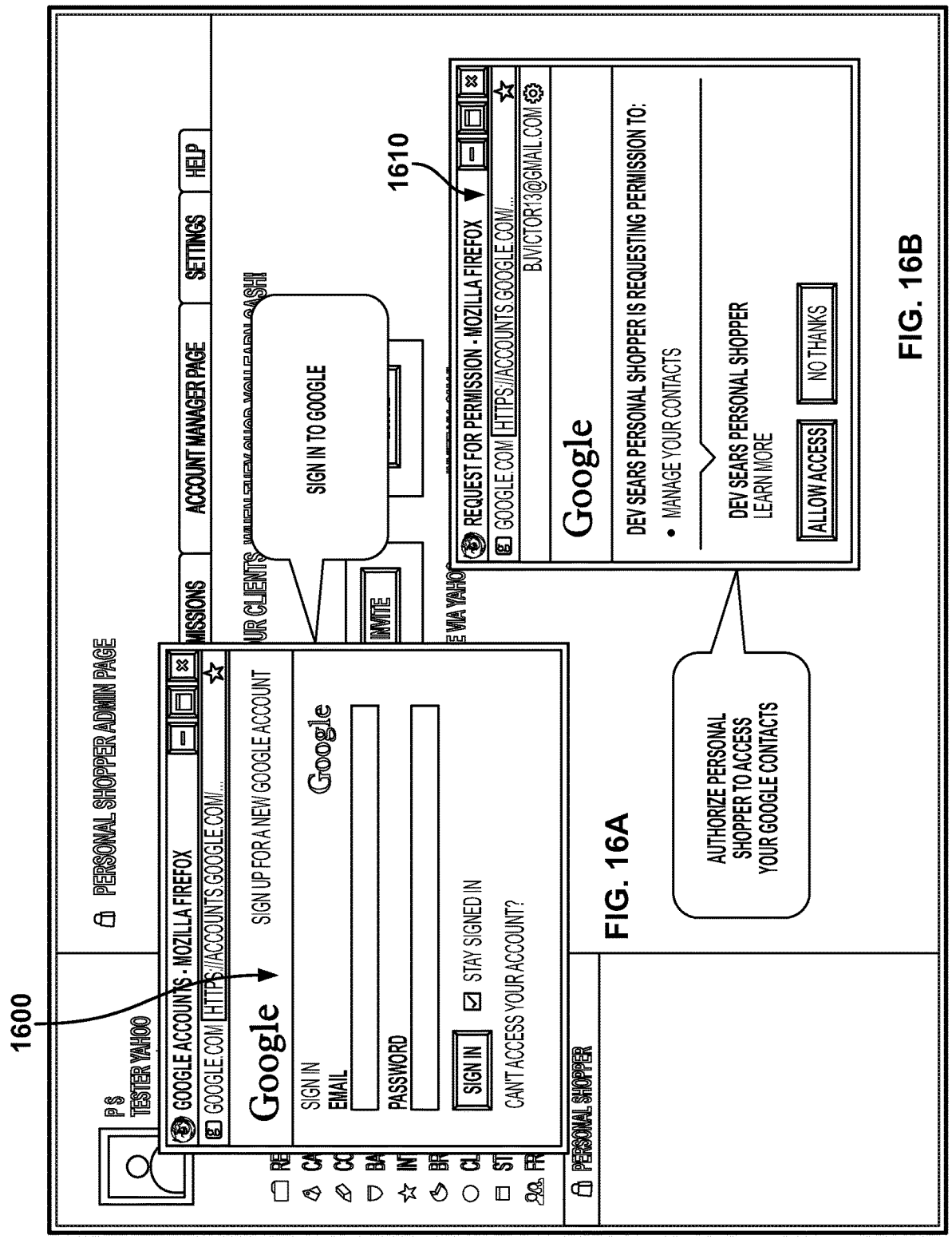

PERSONAL SHOPPER ADMIN PAGE

| CLIENTS | INVITATIONS | COMMISSIONS | ACCOUNT MANAGER PAGE | SETTINGS | HELP |

INVITE FRIENDS AND FAMILY TO BE YOUR CLIENTS. WHEN THEY SHOP, YOU EARN CASH!

☒ INVITE VIA GOOGLE

CANCEL OR [ INVITE ]

☐ CHECK ALL (477) / UNCHECK ALL (477)

| | | |
|---|---|---|
| ☐ | @GMAIL.COM | RA |
| ☐ | @REDIFFMAIL.COM | |
| ☐ | MAIL.COM | KA |
| ☐ | KAR@GMAIL.COM | SE |
| ☐ | RECRUITMENT.TCS.CO.IN | HR |
| ☒ | AN@GMAIL.COM | SA |
| ☐ | BINARY.COM | |
| ☐ | POINTSOLUTIONS.COM | VA |
| ☐ | SONIT.COM | NA |
| ☐ | RIS.NET | |
| ☐ | ARAVANABAVAN@CARITOR.COM | RA |
| ☐ | CINTSOLUTIONS.COM | |
| ☐ | SHAPLANET.COM | PA |
| ☐ | TECH.COM | |

*WE DISPLAY EMAIL ADDRESS AND NAME OF CONTACTS IMPORTED FROM GMAIL*

P S
TESTER YAHOO
PROFILE | INFO

- 🗐 RECENT ACTIVITY
- 🏷 CATALOGS
- 📄 CONTENT ▲
- 🎖 BADGES
- ☆ INTERESTS
- ♥ BRANDS
- ○ CLIQUES
- ▭ STORES
- 👥 FRIENDS

🛍 PERSONAL SHOPPER

| 1. SIGN UP | 2. AGREE TO TERMS | 5. TAKE THE TOUR! |

SEARS PERSONAL SHOPPER<sup>SM</sup> PROGRAM
CLIENT TERMS AND CONDITIONS

THESE TERMS AND CONDITIONS (AS THEY BE AMENDED FROM TIME TO TIME WITHOUT NOTICE, "THESE TERMS") ARE EFFECTIVE AS OF THE DATE YOU ("YOU AND "YOUR") CLICK THE "I AGREE TO THESE TERMS" BUTTON BELOW. THESE TERMS APPLY TO YOUR PARTICIPATION IN THE SEARS PERSONAL SHOPPER PROGRAM (THE "PROGRAM") OFFERED BY SEARS HOLDINGS MANAGEMENT CORPORATION (TOGETHER WITH ITS AFFILIATED COMPANIES "WE," "OUR," AND "US"). PLEASE READ THESE TERMS CAREFULLY AS THEY GOVERN ALL ASPECTS OF, AND YOUR PARTICIPATION THE PROGRAM

YOU AGREE WITH US AS FOLLOWS:

1. CLIENT REQUIREMENTS. A "CLIENT" IN THE PROGRAM APPOINTS A SEARS PERSONAL SHOPPER IN ACCORDANCE WITH THESE TERMS. TO BECOME A CLIENT IN THE PROGRAM ("CLIENT") YOU MUST BE A NATURAL PERSON WHO IS AT LEAST 13 YEARS OLD AND A MEMBER IN GOOD STANDING OF OUR SHOP YOUR WAY REWARDS PROGRAM. YOUR PARTICIPATION IN THE PROGRAM AS A CLIENT WILL BEGIN WHEN YOU CLICK THE "I AGREE TO THESE TERMS" BUTTON BELOW AND YOU HAVE DESIGNATED A SEARS PERSONAL SHOPPER WHOM WE DETERMINE IS A SEARS PERSONAL SHOPPER IN GOOD STANDING IN THE PROGRAM. THE PERIOD OF TIME DURING WHICH YOU ARE A PARTICIPANT IN THE PROGRAM AS A CLIENT IN ACCORDANCE WITH, AND SUBJECT TO, THESE TERMS AND OUR RELATED POLICIES AND PROCEDURES IN EFFECT FROM TIME TO TIME (ALL OF WHICH ARE INCORPORATED INTO, AND FORM AN INTEGRAL PART OF, THESE TERMS) IS REFERRED TO IN THESE TERMS AS "YOUR MEMBERSHIP PERIOD". THESE IS YOUR MEMBERSHIP FEE. YOU MAY DESIGNATE A SEARS PERSONAL SHOPPER AT ANY SPECIFIC TIME. YOU MAY TERMINATE YOUR DESIGNATION OF YOUR SEARS PERSONAL SHOPPER, AND YOU MAY DESIGNATE A NEW SEARS PERSONAL SHOPPER IN ACCORDANCE WITH THESE TERMS, AT ANY TIME DURING YOUR MEMBERSHIP PERIOD BY CONTRACTING US AT HELP@PERSONALSHOPPER.SEARS.COM. YOU MAY NOT BE A SEARS PERSONAL SHOPPER DURING YOUR MEMBERSHIP PERIOD.

YOU ARE PERSONALLY PERSONALLY RESPONSIBLE FOR ALL USERS YOU MAKE OF THE PROGRAM. WE MAY REQUEST PROOF OF IDENTIFICATION AND AGE TO VERIFY YOUR ELIGIBILITY TO BE A CLIENT

CANCEL  ○ I AM AN SHC ASSOCIATE / IMMEDIATE FAMILY OF AN SHC ASSOCIATE [?]   ☐ I AGREE TO THESE TERMS
         ○ I AM NOT AN SHC ASSOCIATE OR IMMEDIATE FAMILY MEMBER

ANGELA STEVENS WOULD LIKE TO BE YOUR PERSONAL SHOPPER.                                               NEXT »

FIG. 21

SEARS | KMART | MYGOFER | CRAFTSMAN | KENMORE | PARTSDIRECT | LANDS' END | THE GREAT INDOORS | SEARS OUTLET | SEE IT ALL ▶    🛒 1 PENDING | HI KEEL

SH🛒P YOURWAY    BROWSE DEPARTMENTS »    SEARCH FOR...    🔍

KEELIN MATSUOKA
PROFILE | INFO

▫ RECENT ACTIVITY
◇ CATALOGS
◆ CONTENT ▲
▽ BADGES
☆ INTERESTS
◊ BRANDS
○ CLIQUES
▫ STORES
👥 FRIENDS

🛍 PERSONAL SHOPPER
🏆 CONTESTS & SWEEPSTAKES

🛍 PERSONAL SHOPPER ADMIN PAGE

| CLIENTS | INVITATIONS | COMMISSIONS | ACCOUNT MANAGER PAGE | SETTINGS | HELP |

👤 AHI AVNON
SINCE NOV 23, 2011
VIEW PAGE   SHC ASSOCIATE  💬?

👤 GIL NINVEH
SINCE NOV 16, 2011
VIEW PAGE   SHC ASSOCIATE  💬?

👤 IIONA PIWKO
SINCE NOV 16, 2011
VIEW PAGE   SHC ASSOCIATE  💬?

👤 NORA SUN
SINCE NOV 16, 2011
VIEW PAGE   SHC ASSOCIATE  💬?

👤 YVONNE FRENCH
SINCE NOV 2, 2011
VIEW PAGE   SHC ASSOCIATE  💬?

👤 ZOOM LILY
SINCE NOV 1, 2011
VIEW PAGE   SHC ASSOCIATE  💬?

SEARS | KMART | MYGOFER | CRAFTSMAN | KENMORE | PARTSDIRECT | LANDS' END | THE GREAT INDOORS | SEARS OUTLET | SEE IT ALL ▶   1 PENDING | HI KEELI

SHOP YOURWAY   BROWSE DEPARTMENTS ≫   SEARCH FOR...

KEELIN MATSUOKA
PROFILE | INFO

🗀 PERSONAL SHOPPER ADMIN PAGE

| CLIENTS | INVITATIONS | COMMISSIONS | SETTINGS | ABOUT |

| CLIENT NAME | ORDER DATE | ORDER AMOUNT | COMM % | COMM $ |
|---|---|---|---|---|
| JIMP@TEST.COM | DEC 6, 2011 | $131.10 | 1.00 % | $1.31 |
| JIMP@TEST.COM | DEC 5, 2011 | $62.20 | 1.00 % | $0.62 |
| JIMP@TEST.COM | DEC 4, 2011 | $59.99 | 1.00 % | $0.60 |
| JIMP@TEST.COM | DEC 3, 2011 | $54.06 | 1.00 % | $0.54 |
| SHOPPER CLIENT ❓ | DEC 2, 2011 | $47.97 | 0.00 % | $0.00 |
| TOTAL TO DATE | | | | $3.07 |

🗀 RECENT ACTIVITY
◆ CATALOGS
◇ CONTENT ▲
▽ BADGES
☆ INTERESTS
◈ BRANDS
○ CLIQUES
▭ STORES
👥 FRIENDS

🗀 PERSONAL SHOPPER
🏆 CONTESTS & SWEEPSTAKES

METHODS AND SYSTEMS FOR PROVIDING PERSONAL SHOPPING SERVICES

CROSS-REFERENCE TO RELATED APPLICATIONS/INCORPORATION BY REFERENCE

The present application is a continuation of U.S. application Ser. No. 15/084,001, filed Mar. 29, 2016, which is a continuation of U.S. application Ser. No. 13/409,678, filed Mar. 1, 2012. The above-identified applications are hereby incorporated herein by reference in their entirety.

FIELD OF THE DISCLOSURE

The present description relates generally to incentive based personalized shopping, and more particularly to methods and systems for providing personal shopping services.

BACKGROUND OF RELATED ART

Personal shopping services have traditionally been provided by an in-store sales associate, or by the hiring of a personal assistant. For instance, in a traditional situation, a customer enters a retail establishment and proceeds to ask a sales associate for assistance. The customer may have no preconceived notion of what they wish to buy and may utilize in-store assistance and/or personal advice to make a purchase. In still other situations, the customer may have an idea of the purchase they wish to make, and yet may still rely upon in-store personal assistance to make additional and/or other purchases based upon any number of factors including the associates recommendations, sales, advice, etc.

In a traditional on-line ecommerce setting, a customer visiting an on-line store front receives little or no assistance regarding their shopping experience. Moreover, receiving personal expertise from a sales associate that understands and knows a customer's likes/dislikes, trends, attitudes, etc. is difficult at best. Thus, in order to enhance the on-line experience, some on-line retailers have begun to provide additional enhancements to their shopping experience. For example, some websites provide customers with sales ranking, similar sales, on-line reviews, textual chats, etc. to assist an on-line customer in making purchase decisions.

These enhancements, however, are oftentimes generic in nature (e.g., what are the overall customer base trends) and do little to assist a buyer on a personal level. What is more, the customer may actually feel put off by the trends of other shoppers as the sophisticated consumer can typically recognize when a recommendation is impersonal and/or they wish to counter the prevailing style.

For example, US Patent Publication No. 2009/0132341 provides for a system and method of advertising utilizing user generated content. In particular, the method provides for a shift from a model of vendors hawking their own wares to a model of users promoting and selling products that the personally find valuable or useful, and rewarding those users selling goods according to the number of generated sales. In general, users with higher quality feedback will receive higher fees for executing product placements. The disclosed system, however, does not provide for a personalized shopping experience, but rather incentives an associate to peddle the most likely to sell product, thereby maximizing sales exposure regardless of the truly personal needs of the end consumer.

While the background systems and methods identified herein, generally work for their intended purpose, the subject invention provides improvements thereto, particularly by providing systems and methods provide for a personalized shopping experiences by tapping into a consumer's social network of individuals who know and understand the consumer on a personal level.

BRIEF DESCRIPTION OF THE DRAWINGS

For a better understanding of the present disclosure, reference may be had to various examples shown in the attached drawings.

FIG. 9B illustrates an example user interface that displays information regarding becoming a personal shopper with the example personal shopping system in accordance with the present disclosure.

FIG. 12 illustrates another example user interface for registering a personal shopper with the example personal shopping system in accordance with the present disclosure by providing tax information.

FIG. 14C illustrates an example user interface for receiving a guided tour of the features of the example personal shopping system in accordance with the present disclosure.

FIG. 16A illustrates an example process by which contacts are utilized to create invitations from the personal shopper to a customer with the example personal shopping system in accordance with the present disclosure.

FIG. 16B illustrates an example process by which contacts are utilized to create invitations from the personal shopper to a customer with the example personal shopping system in accordance with the present disclosure.

FIG. 17 illustrates an example contact list generated by the process of FIGS. 16A and 16B.

FIG. 20 illustrates an example user interface for requesting to become a customer in accordance with the present disclosure.

FIG. 21 illustrates another example user interface for requesting to become a customer in accordance with the present disclosure.

FIG. 22 illustrates an example user interface to allow a personal shopper to manage their associations with various customers.

FIG. 26 illustrates an example user interface to display a communication session between a personal shopper and a customer.

FIG. 30 illustrates an example user interface to display a listing of commissions due to a personal shopper based upon customer purchases.

FIG. 31 illustrates an example user interface to display an account manager administration process.

FIG. 33 illustrates an example user interface to display a communication session between an account manager and a plurality of personal shoppers.

DETAILED DESCRIPTION

Figure 1:
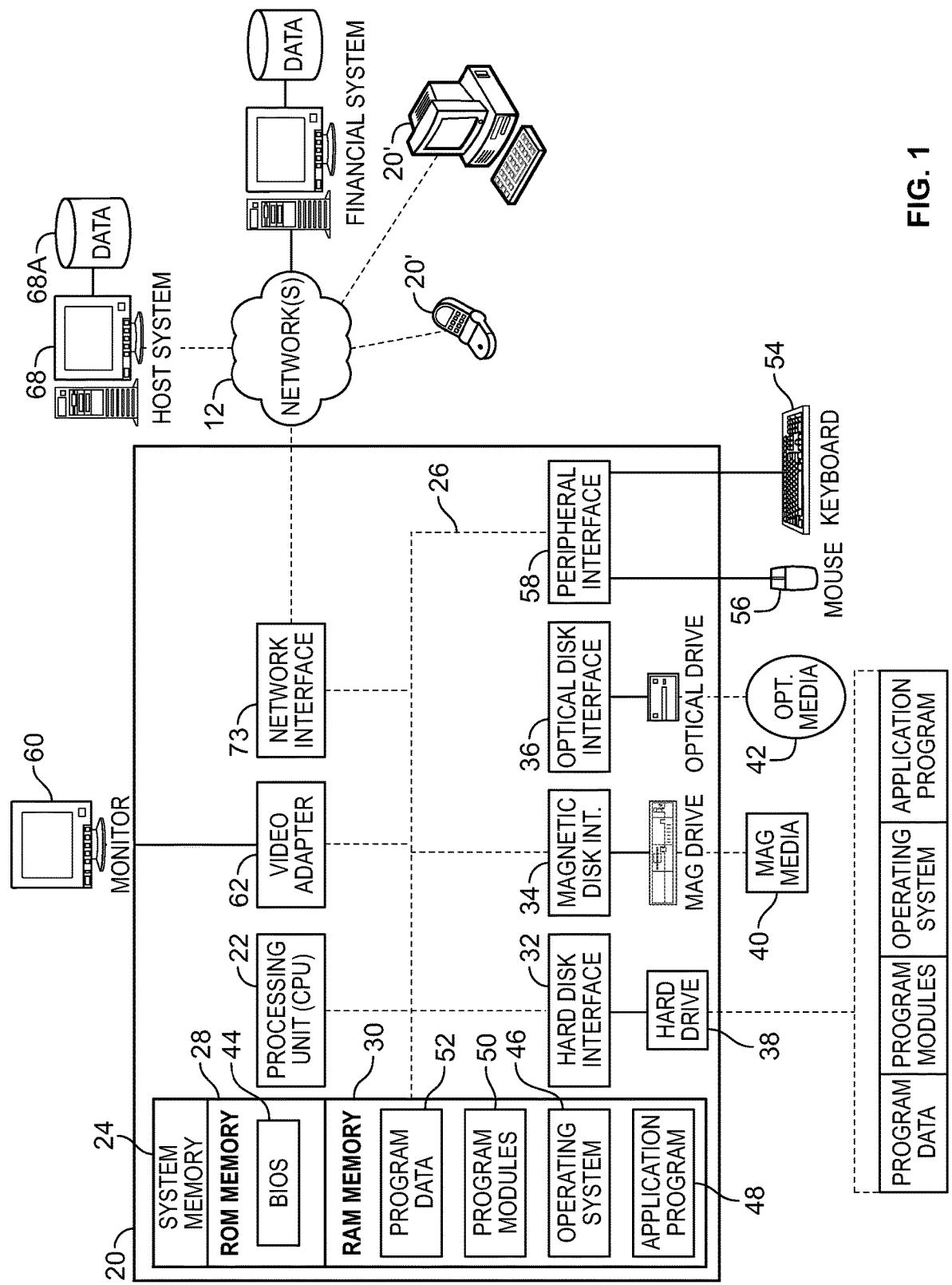
FIG. 1 illustrates in block diagram form components of an example, computer network environment suitable for implementing the example service call systems disclosed.

The following description of example methods and systems is not intended to limit the scope of the description to the precise form or forms detailed herein. Instead the following description is intended to be illustrative so that others may follow its teachings.

A personal shopper application is explained hereinbelow. In general, the application allows for the formation of a connection between a sales associate and a consumer for the purposes of forming a personalized shopping experience. The disclosed invention leverages sales associates' and/or consumers' social connections, such as through a social media website, to enable each personal shopper to provide the highest possible customer service to each of their associated consumers. In this example, the system may leverage a retail establishment's online product catalog, which is oftentimes larger than an in-store inventory) to provide the personal shopper the ability to offer a vast assortment of goods and capabilities. Specifically, the more a personal shopper knows about the products and services, and their customers, the more they can influence their network to consider an associated in-store and/or on-line retail establishment.

In the example systems and methods disclosed, a personal shopper identifies potential people within their social network that may be interested in being a personal client. Alternatively, a client may request the services of the personal shopper through recommendations, knowledge, social networking, etc. Once the relationship is formed, the more products that the personal shopper's network buys based upon their recommendations, the more potential there is for the personal shopper to earn a reward, such as for example, reward points, items, and/or cash.

In order to accomplish the consummation and development of the personal shopper an customer relationship, the present disclosure provides the personal shopper with the tools necessary to provide their services to their network of clients through at least the use of social media. For instance, the present system allows existing customers to be engaged by providing relevant, personal recommendations generated through social networking, thereby increasing the value to both the customer and the shopper.

In the present disclosure, both online and offline activities may be influenced by the personal shopper. In other words, both online and retail purchases may be influence and tracked by the system. Still further, the online and/or offline tracking may be within the corporate establishment or may be within a network of establishments through partnerships, cooperation, etc. The social interaction may be used by either of the personal shopper and/or the consumer for ecommerce, social media, retail, multichannel retail, mobile, and tablet enhancements as well as the gamification of a customer experience (e.g., viral marketing, campaigning, gaming, funware, etc.). In one example, the application enables a customer to find and communicate with a personal sales associate based upon the customer likes/dislikes, needs, want, location, purchase intentions, etc. The system allows a one-to-one, one-to-many, and/or a many-to-many communication and/or hierarchical scheme to accomplish a higher level of customer satisfaction and repeat patronage.

In this system, the personal shopper (e.g., the sales associate) may be an expert, question and answer provider, merchandise associate, friend, acquaintance, etc., to provide information regarding a consumer's intended purchase. Still further, in some examples, the application allows a personal shopper to proactively contact and/or otherwise communicate with their network to proactively and/or reactively provide merchandise suggestions. In other words, the system allows a personal shopper to push content to their clients when they know the client may be interested. The present application provides may provide specific personal shopping assistance through any suitable electronic device, including, for instance through any suitable mobile device.

In one example, the system provides the use of commodity hardware, off the shelf software, OS independent applications, form factor independent devices (PC, tablets, smart phones etc), media independent (voice, text, video) and cloud based infrastructure to run all functionalities of the present system. In the context of a service establishment, such as, for example, a retail store this is specifically very useful as a customer can utilize familiar technologies and receive relate and personalized support, assistance, product demos, suggestions, etc., which can be handled by the personal shopper who has the most expertise and relevant information and who are familiar with their client's needs and/or purchasing needs.

The disclosed methods and systems may be part of an overall shopping experience system created to enhance the consumer shopping event. In one example, the disclosed personal shopping network is integrated with the customer's reward system, the customers social network (e.g., the customer can post their shopping activity conducted through the system to their social network), the customer's expert system, digital/mobile applications, shopping history, wish list, location, merchandise selections, or the like. It will be appreciated, however, by one of ordinary skill in the art that the system disclosed may be fully and/or partially integrated with any suitable shopping system as desired, including those not mentioned and/or later designed.

With reference to the figures, the following discloses various example systems and methods for providing personal shopping assistance on a computer network, such as a mobile device. To this end, a processing device 20", illustrated in the exemplary form of a mobile communication device, a processing device 20', illustrated in the exemplary form of a computer system, and a processing device 20 illustrated in schematic form, are provided with executable instructions to, for example, provide a means for a customer, e.g., a user, client, personal shopper, customer, buyer, consumer, etc., to access a host system server 68 and, among other things, be connected to a hosted social networking site, a user profile, a sales associate, a personal shopper, and/or a client. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, a personal computer, a mainframe computer, a personal-digital assistant ("PDA"), a cellular telephone, a mobile device, a tablet, an ereader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules, and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, coordinating a personal shopper relationship, providing a social network, storing a user's personal information, facilitating recommendations, providing access to merchandise, etc.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2A:
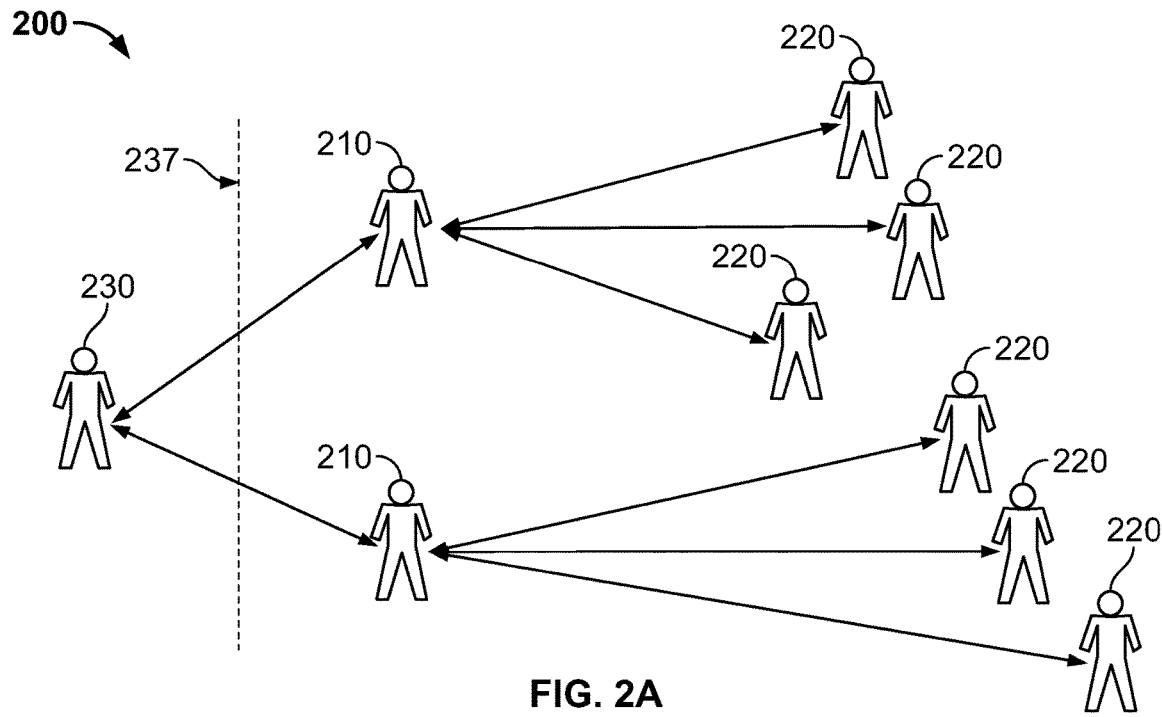
FIG. 2A illustrates an example personal shopping system in accordance with the present disclosure.

Referring to FIG. 2A, there is illustrated an overview of an example personal shopping system 200 in accordance with an example of the present disclosure. The system 200 is well-suited for operation on a distributed network system, such as, for example, the Internet, cloud, mobile network, cellular network, or other suitable wired and/or wireless network. The system 200 may be implemented in various other communication networks and/or mediums as desired including, for example, a localized, non-distributed network.

Generally speaking, the system 200 is operable to facilitate a personal shopping relationship between a sales associate and a customer. For instance, in the illustrated example, a sales associate 210 (e.g., a personal shopper, etc) develops and/or otherwise formalizes a sales relationship with a plurality of customers 220 (e.g., user, consumer, shopper, etc.) having need and/or desire of assistance. In one example disclosed, the sales relationship may be commission based. The system 200 may include a plurality of sales associates 210 servicing the needs of multiple customers 220. The sales associates may be employees of the organization sponsoring the system 200, or may alternatively be outside of employment of the organization such as, for instance a contracted associate. In the example illustrated in FIG. 2A, the sales associates are outside of the employment of the retail establishment, and are in turn serviced and/or supported by at least one account manager 230 who, in this example, is an employee of a retail establishment 237. Additionally, as noted above, the system 200 supports one-to-one, one-to-many, and many-to-many relationship architectures.

Figure 2B:
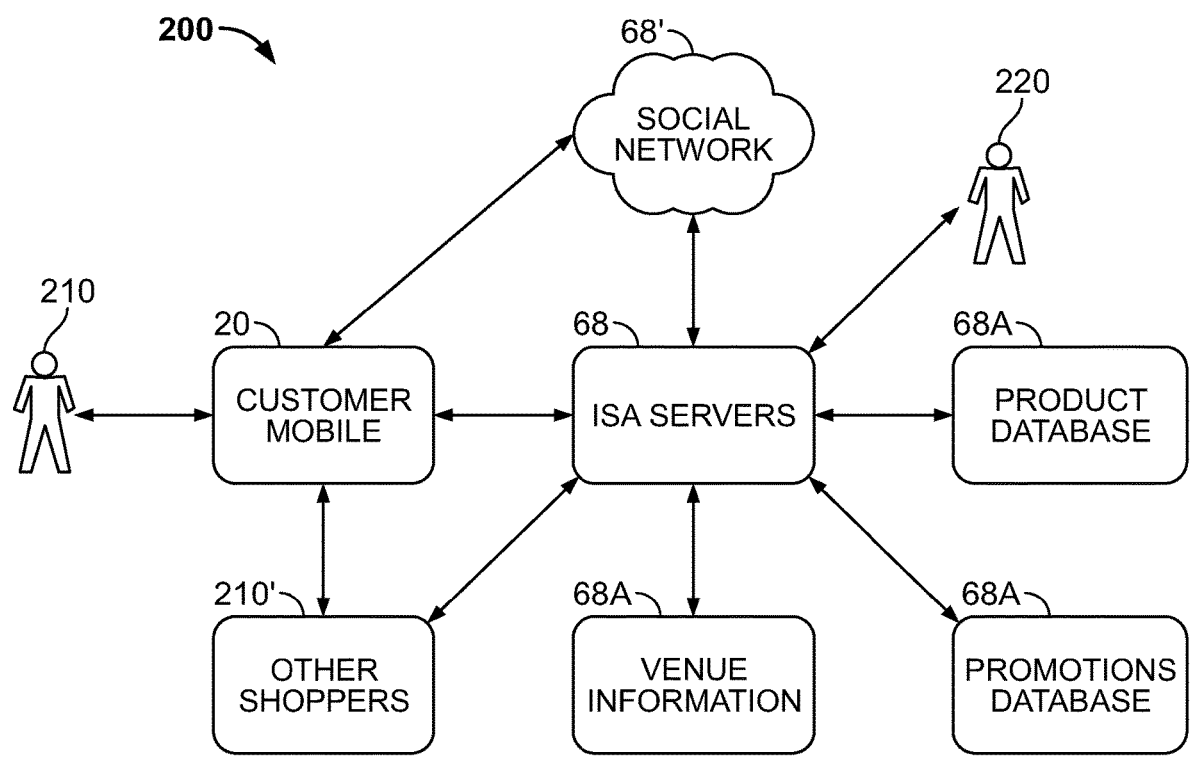
FIG. 2B illustrates an example system for providing personal shopping via a mobile device.

Turning now to FIG. 2B, there is illustrated another example of the personal shopping system 200 described above. In this illustration, the system 200 allows the personal shopper 210 and the consumers 220 to utilize the devices 20 to connect to the host server 68. The host server 68 meanwhile creates a virtual connection between the personal shopper 210 and multiple customers 220. As described, the system 200 provides significant technical support to both the customer 220 and the personal shopper 210 such as, for example, by providing access to and utilizing a social network 68', such as for example, a retail specific social network and by providing access to venue and personal information, promotional database information, and product database information stored on the data repository 68A. Additionally, the system 200 may allow additional users to vote, comment, recommend, and/or otherwise provide input into the personal shopping experience.

Figure 3:
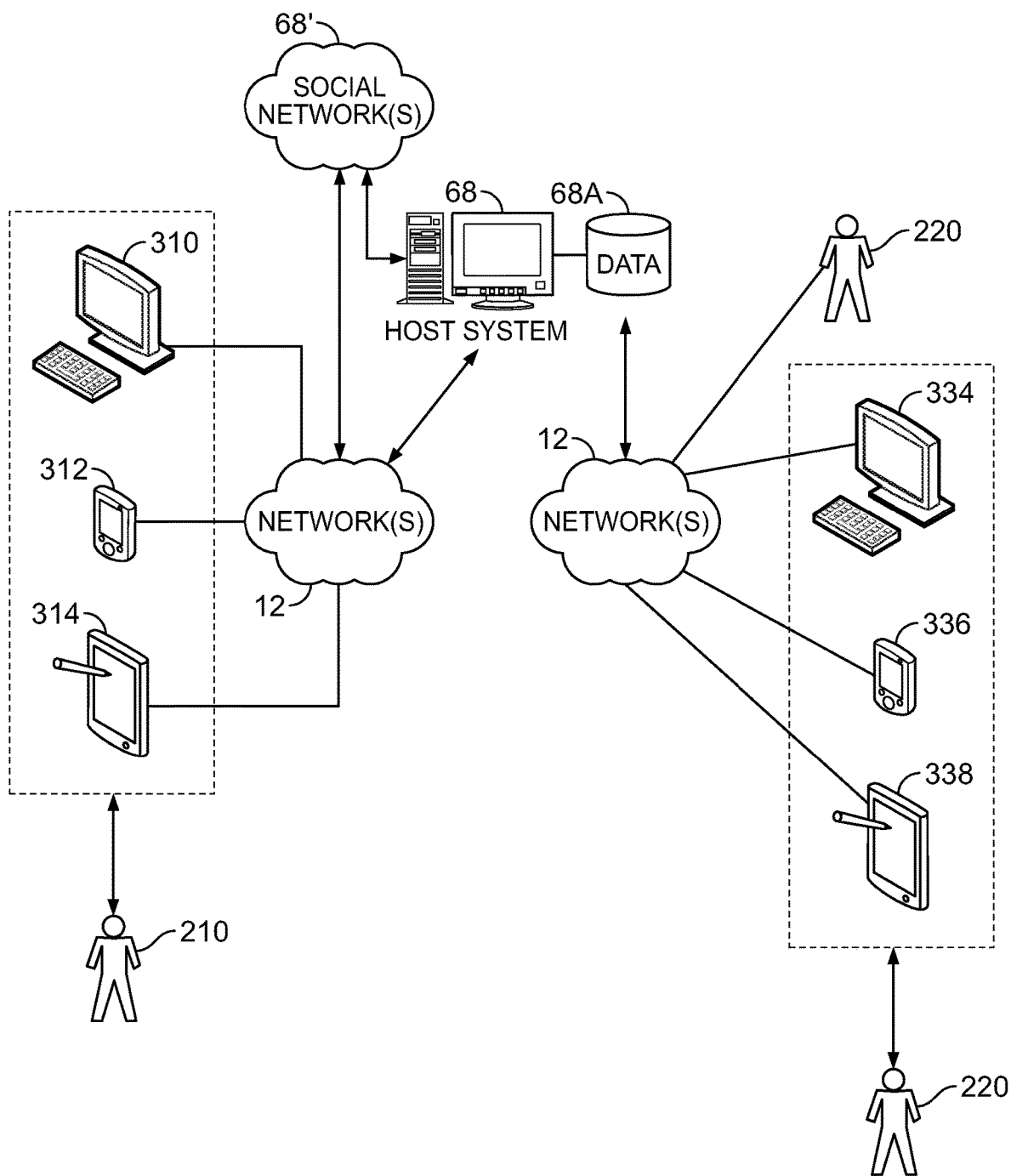
FIG. 3 illustrates a wire diagram of an example system for a providing personal shopping in accordance with the present disclosure.

As illustrated in more detail in FIG. 3, in this example, the personal shopper 210 may access the system 200 through any suitable device, such as a computer system 310, a smart phone 312, a tablet computer 314, or any other suitable known or yet to be developed communication device. In the disclosed example, the communication device is capable of video transmission (e.g., video chat, video phone, etc), but it will be appreciated by one of ordinary skill in the art that the communication device may be any suitable communication device including any voice, email, and/or text communication without use of video transmission. Once the personal shopping relationship is established, the system 200 is accessed through the network(s) 12 to the host server 68. In this example, the personal shopper accesses the system 68 through a separate network 12 than the consumer's network access, but it will be appreciated that the network access may be architected in any suitable manner. Each of the network(s) 12 provide network routing of the utilizing a cloud based network, although any appropriate routing device (software, firmware, hardware, and/or the like) may be utilized. The personal shopper access then routed to the consumer 220 as necessary one example of which will be described below. The connection to the consumer 220 may be through the network 12, through the social network 68', and/or through the host system 68. Each of the consumers, meanwhile may access the system 200 with any suitable access device including a computer 334, a smart phone 336, a tablet computer 338, or any other device.

The illustrated approach may take advantage of the convergence of mobile devices, IP telephony (e.g., VoIP, SIP, etc) and Internet application such as, for example, Facetime, Skype, etc. The example call center system may also enable interactive communications amongst personal shoppers, customers, retail associates and partners, etc, across varied platforms, (e.g., iOS, Android, Windows, etc.), devices (e.g., Mobile phones, PCs, Macs, Tablets, etc), networks (e.g., Wi-Fi, 3G, 4G, etc.), and media (e.g., voice, text, video, etc).

Figure 4:
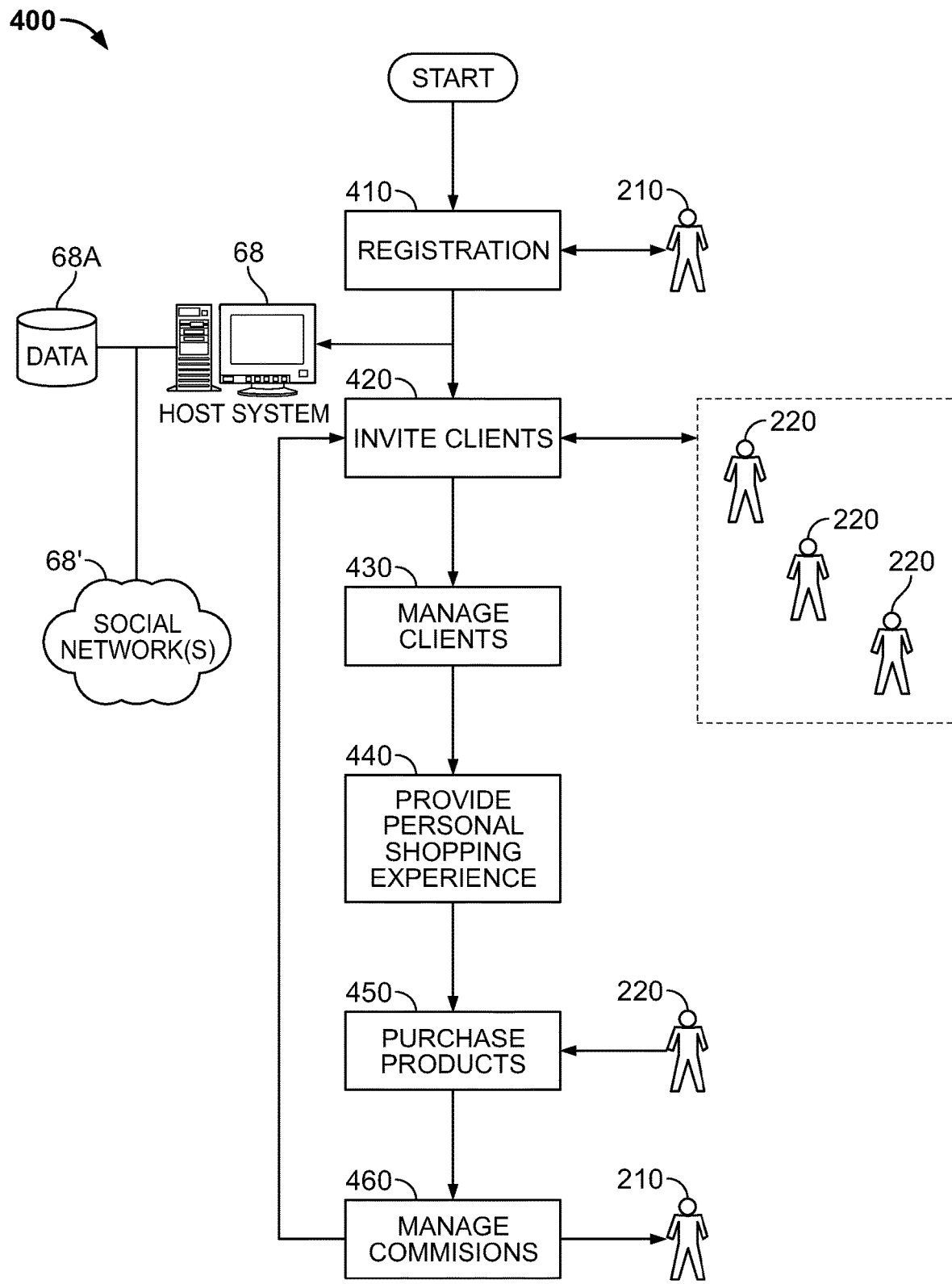
FIG. 4 illustrates a flowchart of an example process of the disclosed personal shopping system in accordance with the present disclosure.

Turning now to FIG. 4, to provide the personal shopper 210 with the capability to obtain clients, service clients, and receive commissions, the system 200 includes a registration and management process 400. In this example, the process 400 begins with a registration process at a block 410. The registration process is an introduction to the system 200 and includes information regarding required to become part of the personal shopping network such as personal information, acceptance of terms and conditions, tax information (for commission based systems) and the like. Typically, the registration step will include the ability to cull the personal shoppers already existing social media accounts and/or electronic address book to suggest various clients for inclusion in the person shopper's network.

Once the registration process is complete, the process 400 continues with an invite process at block 420. As noted the invite process may include the culling of already existing contacts, and/or may provide the personal shopper the ability to manually invite clients, or browse a listing of participating people whom the personal shopper may know to invite those clients as well. The system 200 strives to create a Personal Shopper program that connects the personal shopper 210 with friends, who similarly care where and with whom the personal shopper shops and who take the initiative to find all of the items the client needs using the full breadth of our properties and services stored in the data repository 68A. The system 200 enables sales entrepreneurs to build their own business around service-minded value and social influence.

In one example, the system 200 may leverage socially-connected individuals (personal shoppers 210) who receive a commissions on their friends' spending, such as for example, a one-percent commission on regular purchases, and a two percent commission on purchase through networks with twenty or more clients. The system 200 may provide commission specials that vary based upon any number of factors including time based, product based, category based, etc. As noted, the primary source of personal shopping clients is the personal shoppers existing social networks 68'. As also noted, the system 200 also assigns vetted leads to proven shoppers who are system 200 members as a benefit, while recognizing top performers and managing turnover from the start with transparent metrics.

Once the personal shopping and client relationship is established, the personal shopper 210 then proceeds to manage their clients 220 at block 430. For example, the personal shopper may utilize the server 68, the data repository 68A and the social media site 68' to provide each of the clients with personal and/or semi-personal services, including, for instance, education (product, trends, etc), training (e.g., use of products, improvements, etc.), provide and/or receive feedback on purchases and/or preferences, and/or to empowerment of the personal shopper to make all or a limited amount of purchases on the customer's behalf. By adding the social media aspect 68' the described personal shopping system 200 may become viral, fun, and/or competitive (e.g., leader boards, etc.). Moreover, the system 200 may track the best and/or most active personal shoppers and suggest connections between various customers based upon metric and analyzed performances.

For example, the system 200 may provide customer profile management and analysis. These analytical tools may include a log of client communications and actions; profile data fields; click to chat, etc. The system 200 may also provide an activity feed and an activity planner that includes a listing of recent client actions and checkins (e.g., customer locations, etc.). By providing these analytic tools, each of the personal shoppers know where they stand in context on strategic and bottom-line metrics. The system 20 provides for a messaging system such as a mobile component, which may integrate with mobile, online chat, email, etc. Finally, the system 200 may provide the capability to post activity to the social network 68' and share activity and successes to alert friends when we personal shoppers offer great service that generates value for themselves and their clients.

In some examples, in order to reward top performing individuals, the personal shopper 210 may receive a high-spending qualifying client without needing to have a personal connection. In this instance, the system 200 manages these opportunities by messaging the opportunity to VIP members as a special benefit to being one of the system's 200 most valuable members. In these instances, the VIP members may be provided with the capability to schedule a private chat or conversation with the personal shopper 210 before deciding to accept the invitation, to reject it entirely, or to request a different personal shopper. The system, therefore, uses analytics to match VIP members and personal shoppers based on location and shopping interests. Additionally, the system may target top performing personal shoppers with fewer than a predetermined amount of clients (e.g., 50 clients), so that they are able to give VIP members a high level of attention. In still other example, the system 200 allows a customer 220 to request a particular personal shopper 210, but they would not be guaranteed one. For instance, in one implementation, access is prioritized towards those who have a pre-existing connection or are likely to be extremely valuable customers (e.g., VIPs) for the personal shopper 210.

By managing their client base, the personal shopper 210 is capable of providing a personal shopping experience to the client 220 at a block 440. In this instance, the personal shopper 210 can view clients' interests, view recent activity, build and maintain personal catalogs, review various brands, examine cliques and various trends, examine store inventory, including new inventory, etc, and look at recommendation from various friends, etc.

To provide the ability to provide a personal shopping experience, the system 200 provides for a robust system of notifications. For example, the system 200 may allow the personal shopper 210 to "push" emails, texts, and/or other communications to the clients 220. Obviously, the client 220 may also communicate directly with the personal shopper 210, requesting assistance, services, etc. Additionally, either the personal shopper 210 or the clients 220 may be able to create a customized catalog of products that may be of interest and provide the catalog to the other partner for comment and/or advice. Additionally, while utilizing the system 200, the user interface may provide a listing of clients and/or friends that are currently online, and additionally allow a select group of individuals to go on a virtual shopping trip together through browser sharing.

Once the personal shopping stage has been completed, it is up to the client 220 to decide if they wish to make the ultimate purchase of the recommended goods at block 450. By choosing a recommended product, the ultimate purchase is credited to the personal shopper and is eligible for a reward. As with any sales opportunity, if the consumer 220 decides not to make the purchase, the personal shopper 210 may edit, redefine, select, etc., different products for recommendation to the consumer 220 based upon feedback and/or changing circumstances in order to entice the client 220 to make a final purchase.

Once the purchase has been made, however, the purchase is credited to the personal shopper account at a block 460. In this example, the system 200 provides a reward such as a commission based upon the total purchase price. In one implementation, the commission may be a one-percent commission, but the reward may be tied to any incentive program including, for example, reward points, promotional items, gifts, cash, discounts, etc.

Figure 5:
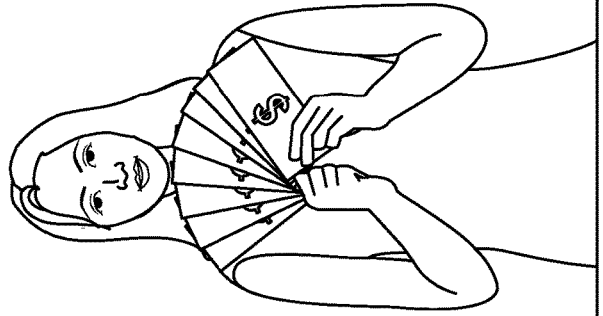
FIG. 5 illustrates an example user interface for registering a personal shopper with the example personal shopping system in accordance with the present disclosure.

In order to implement the system 200, a plurality of user interfaces may be displayed to the consumer 220 and the personal shopper 210 as illustrated in FIGS. 5-33. Specifically, referring first to FIG. 5, an example user interface 500 for beginning the registering and management of personal shoppers is shown. The user interface 500 provides a potential personal shopper with information regarding the program, as well as the ability to receive information from a list of frequently asked questions. The interface 500 also allows the personal shopper the ability to accept and/or request an invitation to become a personal shopper.

Figure 6:
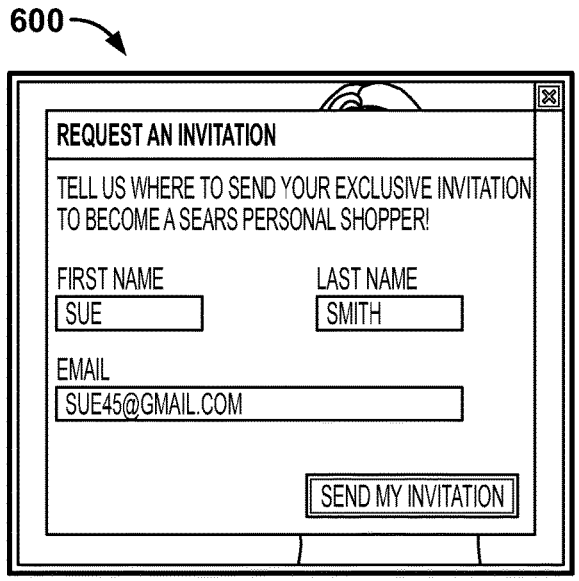
FIG. 6 illustrates an example user interface for requesting to become a personal shopper in accordance with the present disclosure.
Figure 7:
FIG. 7 illustrates an example user interface for receiving confirmation of the request to become a personal shopper in accordance with the present disclosure.
Figure 8:
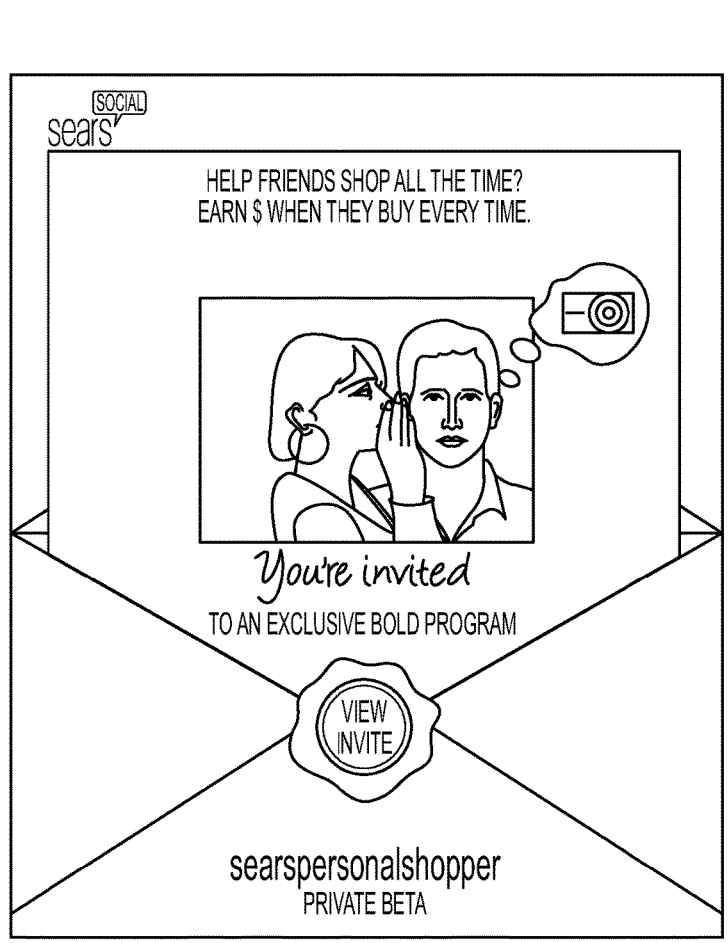
FIG. 8 illustrates an example user interface for displaying an invitation to become a personal shopper in accordance with the present disclosure.
Figure 9A:
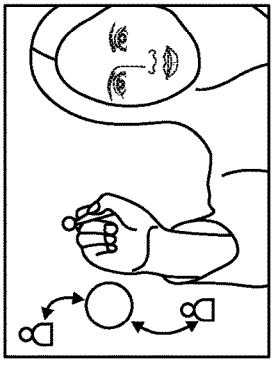
FIG. 9A illustrates an example user interfaces interface that displays information regarding becoming a personal shopper with the example personal shopping system in accordance with the present disclosure.
Figure 9B:
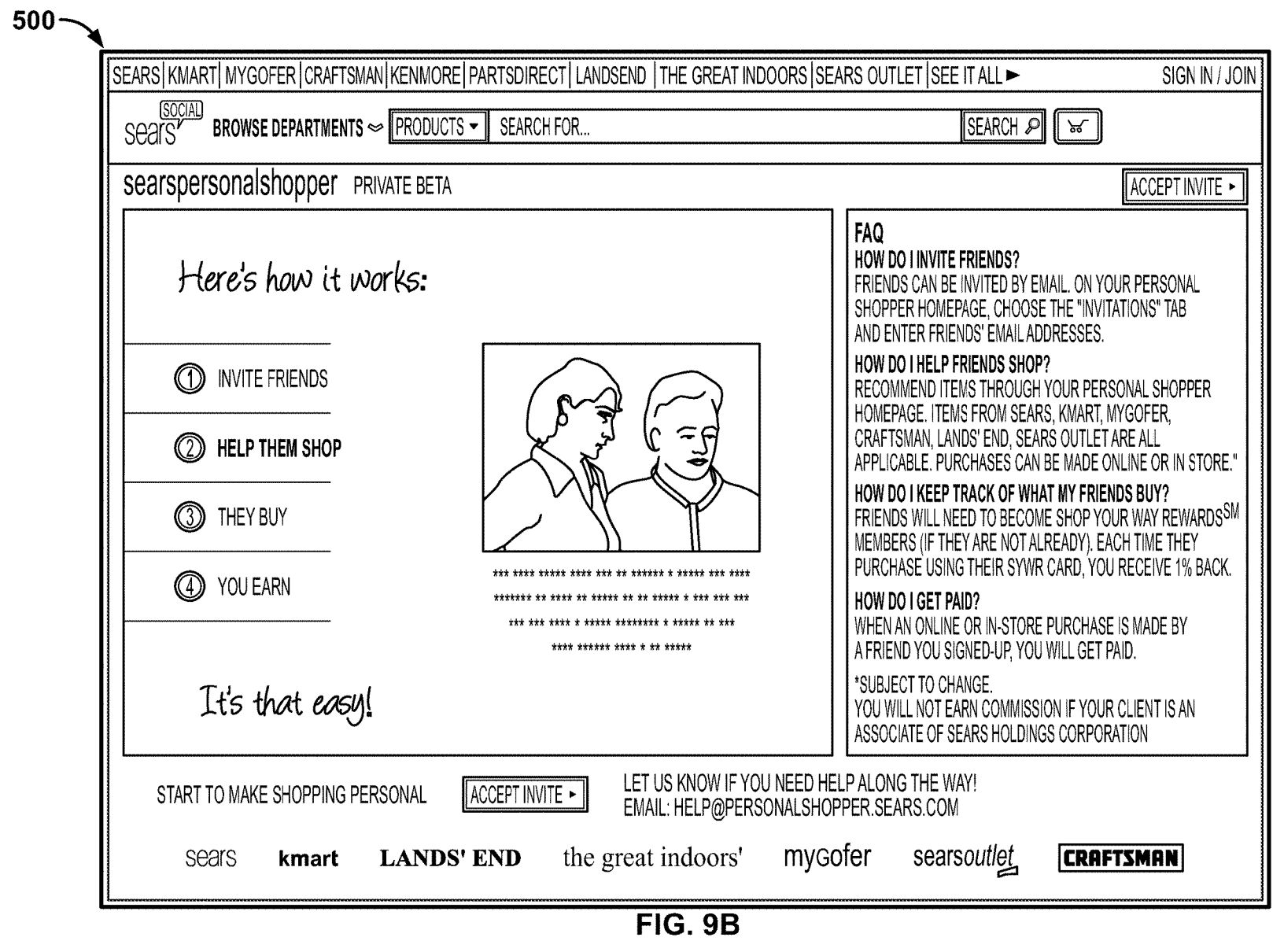
Figure 9C:
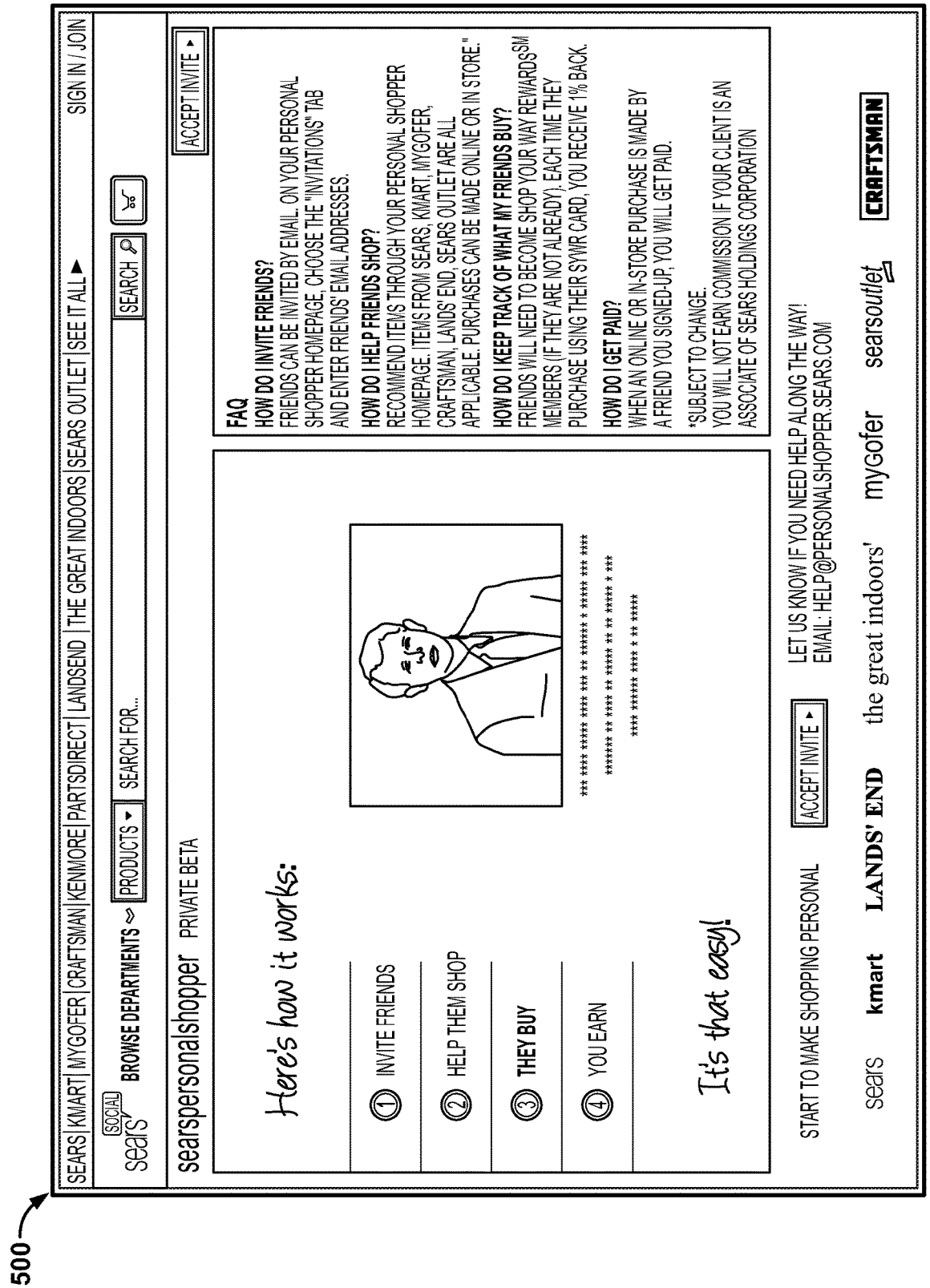
FIG. 9C illustrates an example user interface that displays information regarding becoming a personal shopper with the example personal shopping system in accordance with the present disclosure.
Figure 9D:
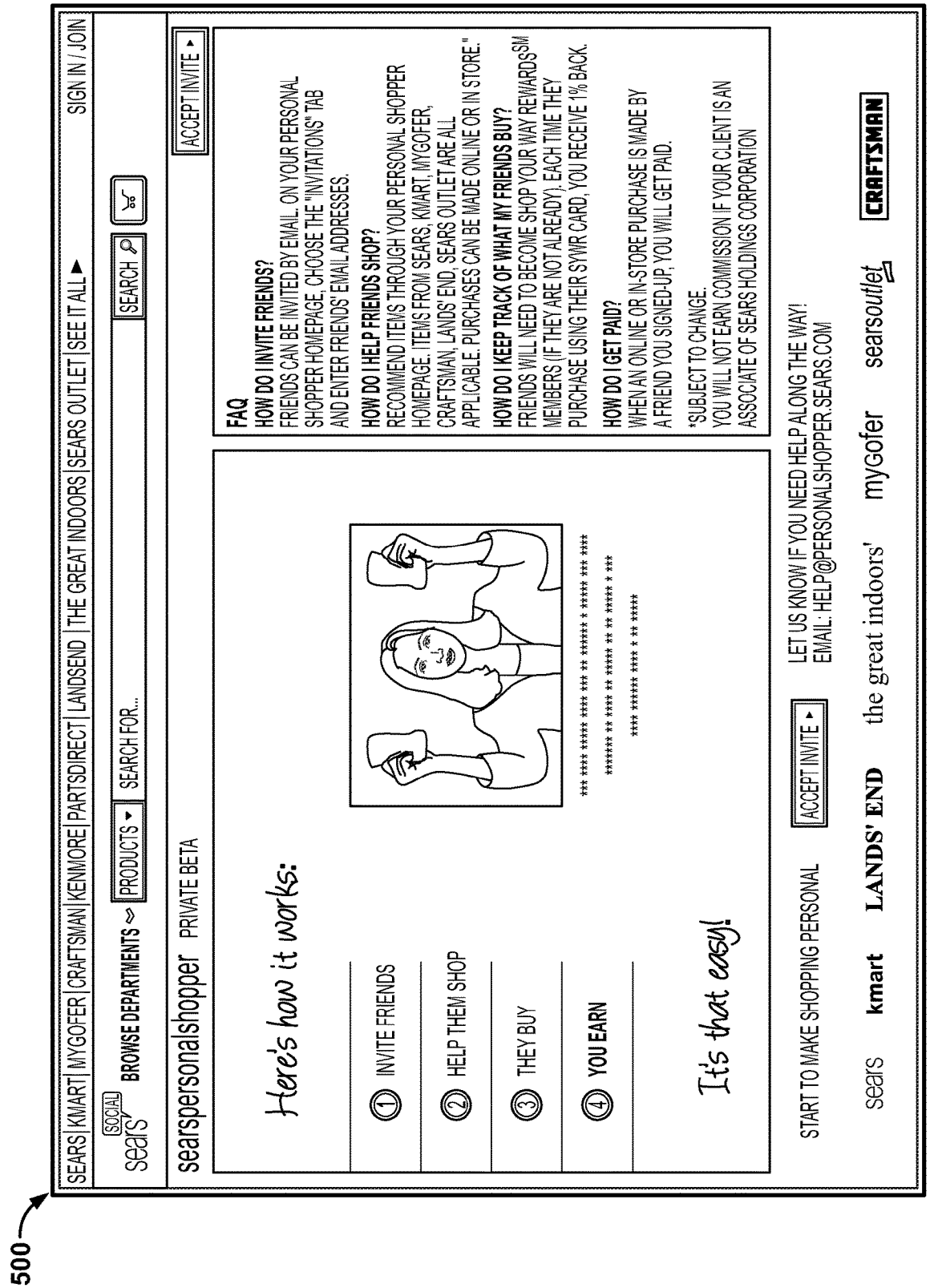
FIG. 9D illustrates an example user interface that displays information regarding becoming a personal shopper with the example personal shopping system in accordance with the present disclosure.

Referring to FIGS. 6-7, once the personal shopper 210 accepts and/or requests an invitation, the system may generate user interfaces 600 and 700 which request information from the personal shopper 210 and confirm that the invitation has been sent to the proper location for processing. FIG. 8 illustrates one example of an invitation 800 that may be received from the system 200 inviting the personal shopper 200 to join. FIG. 9A-9B illustrate various additional example of the user interface 500 illustrating the beginning page for the registration process.

Figure 10:
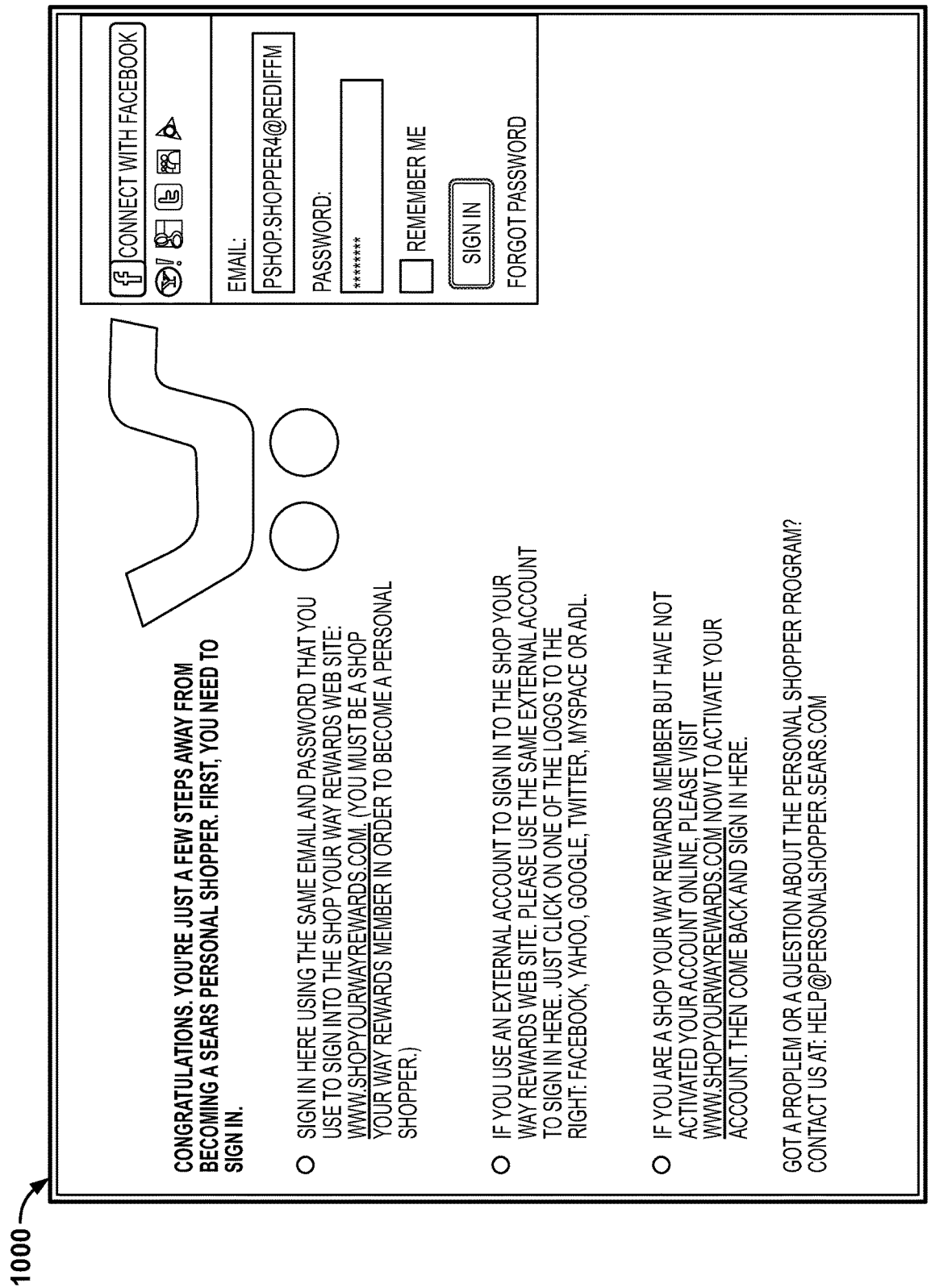
FIG. 10 illustrates an example user interface providing a congratulatory message regarding registration with the example personal shopping system in accordance with the present disclosure.
Figure 11:
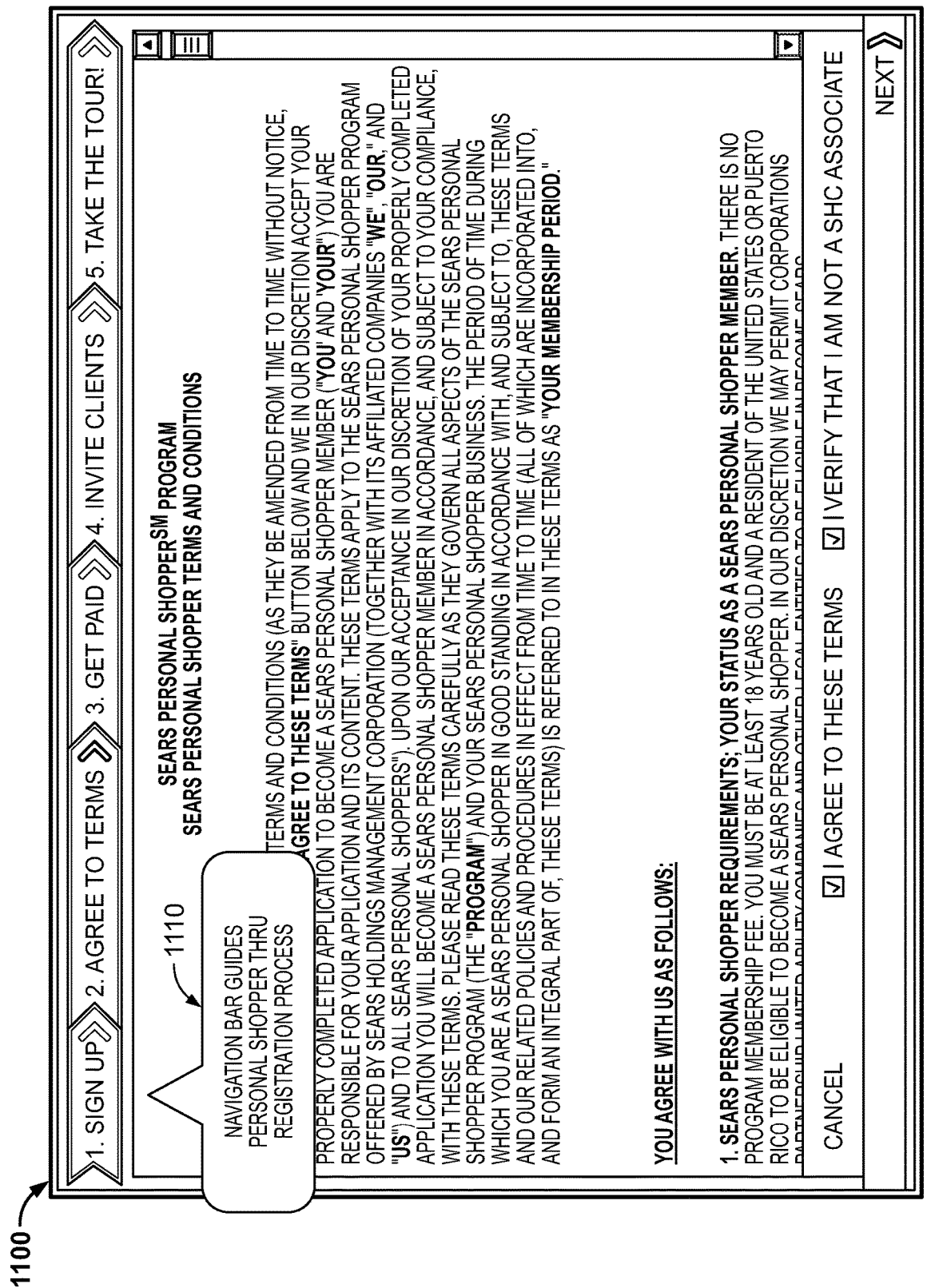
FIG. 11 illustrates an example user interface for registering a personal shopper with the example personal shopping system in accordance with the present disclosure.
Figure 12:
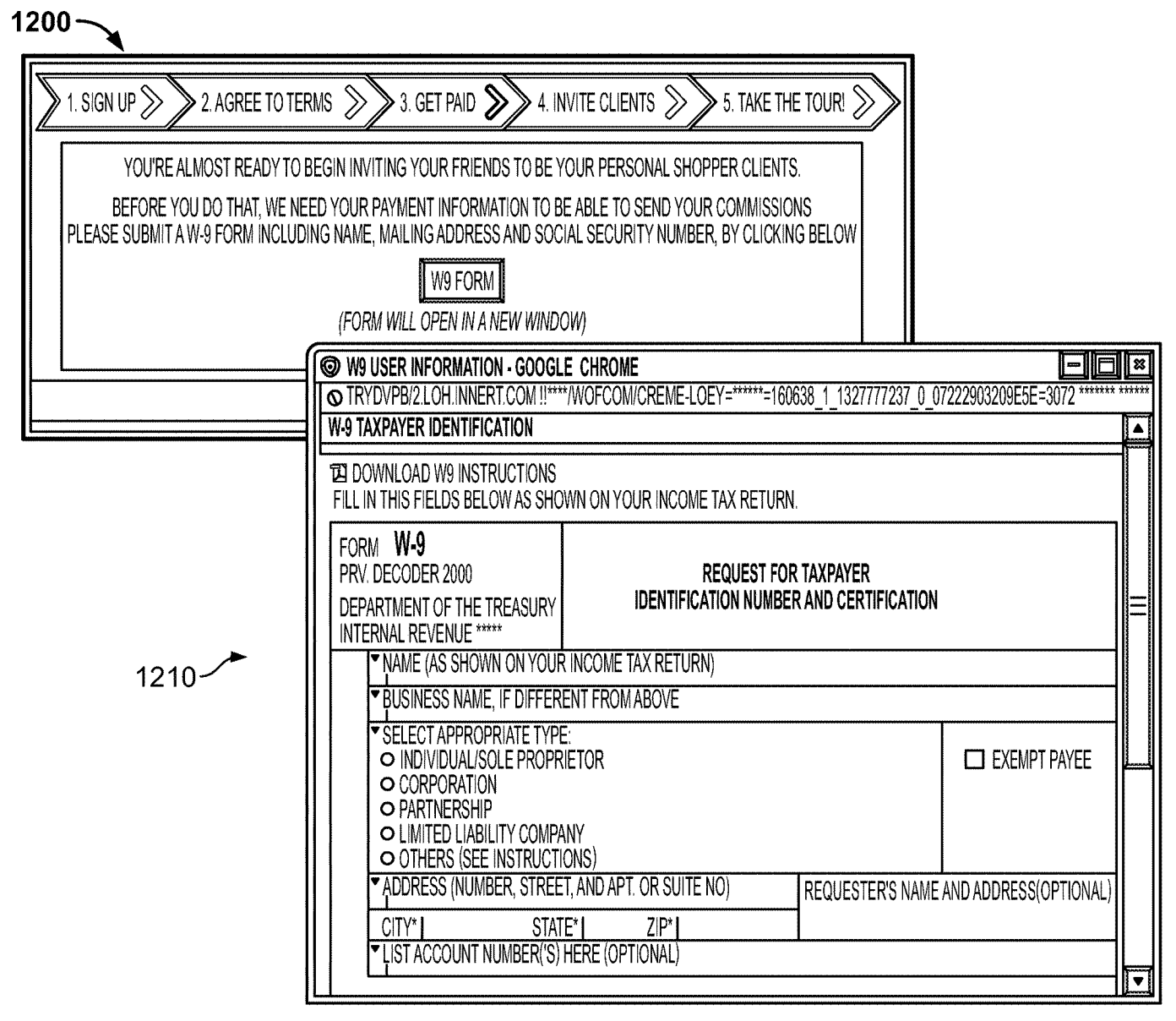
Figure 13:
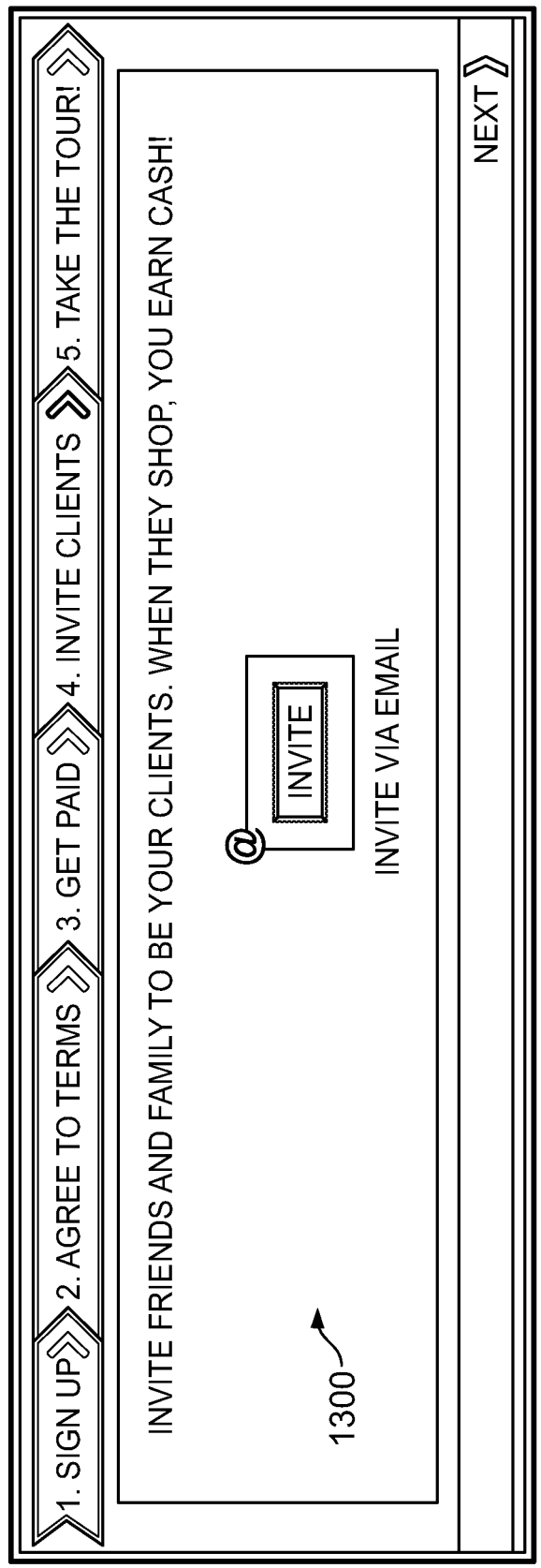
FIG. 13 illustrates an example user interface for inviting an association of a customer with the personal shopper in accordance with the present disclosure.

Once the personal shopper 210 receives confirmation of registration, the personal shopper 210 is provided with a welcome screen embodied in a user interface 1000 as shown in FIG. 10. With the user interface 1000, the shopper 210 is presented with the ability to sign into their account and begin using the system 200. In order to proceed with the registration process, the shopper is provided with a series of screen as illustrated in FIGS. 11-13. For example, as shown in FIG. 11, a user interface 1100 provides the shopper 210 with the required ability to accept the terms and conditions of membership. As seen, a navigation bar 1110 may be provided to assist the shopper 210 in navigating the system screens. Once the terms and conditions are excepted, user interfaces 1200 and 1210 are provided to the shopper 210 to allow the shopper to provide the required US tax forms for receipt of payment. Of course, it will be appreciated that in the instance where payments are not rewarded to the personal shopper, or where the tax forms are not required, the interfaces 1200 and 1210 may be eliminated as desired.

Figure 14A:
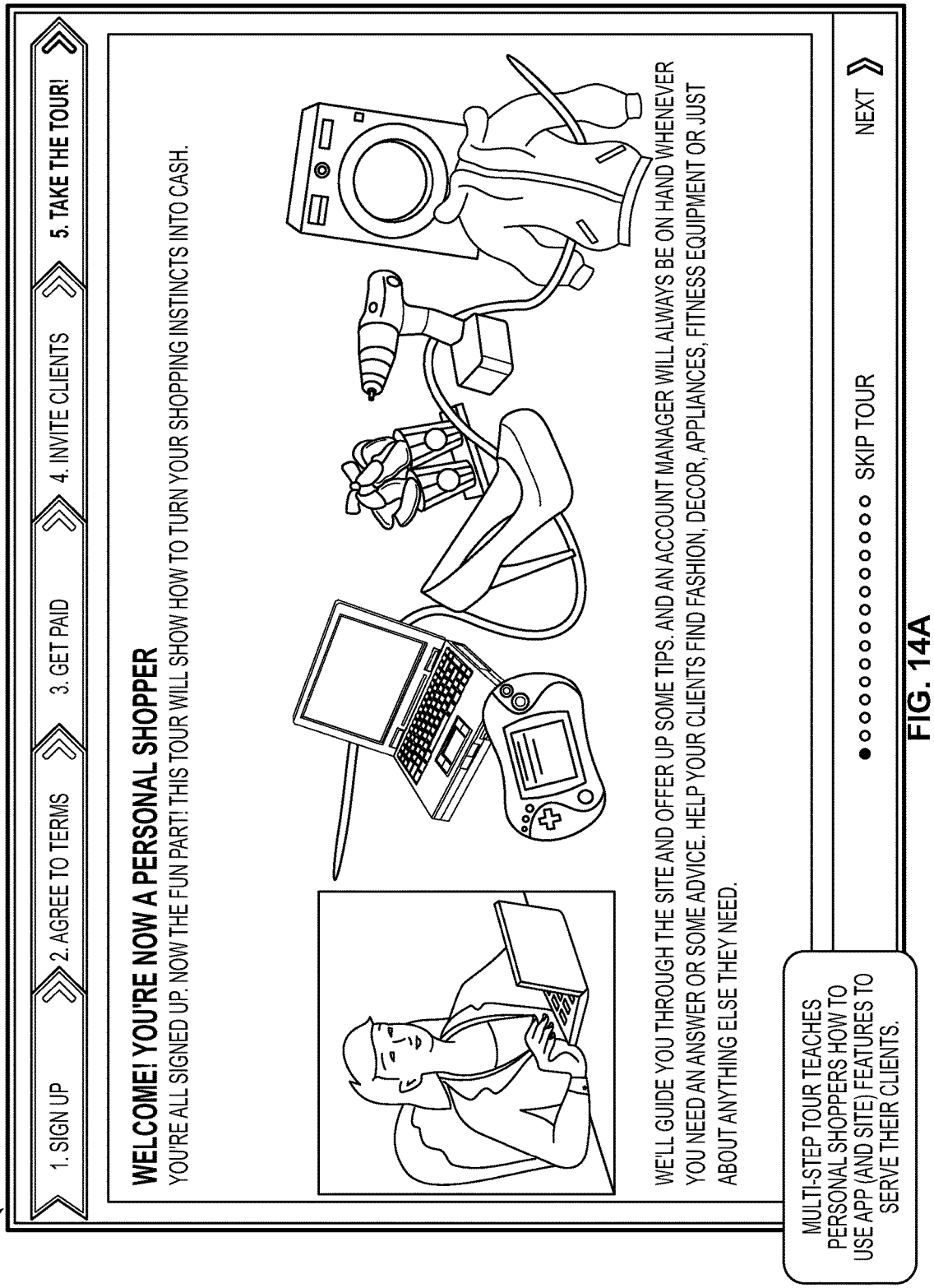
FIG. 14A illustrates an example user interface for receiving a guided tour of the features of the example personal shopping system in accordance with the present disclosure.
Figure 14B:
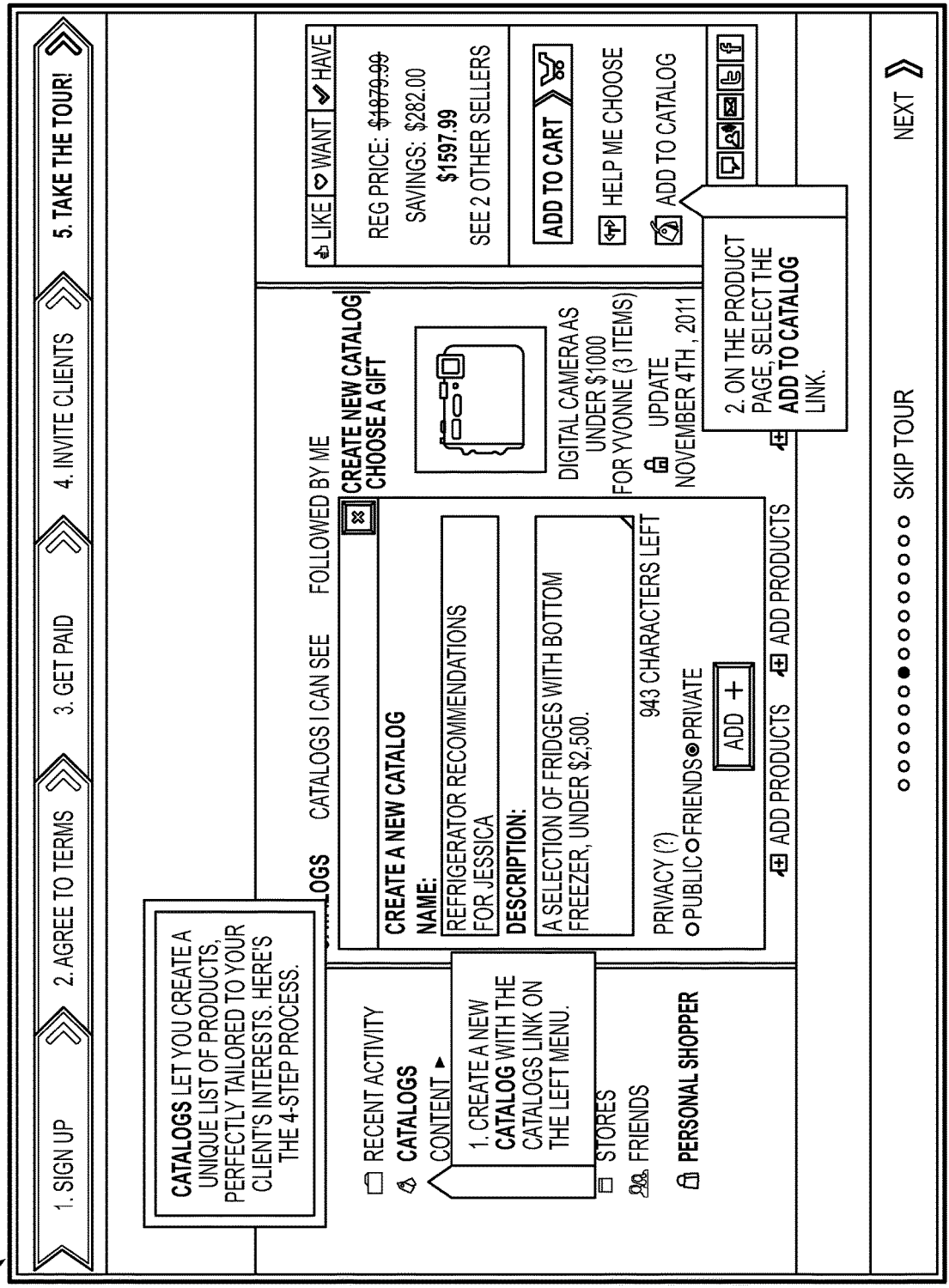
FIG. 14B illustrates an example user interface for receiving a guided tour of the features of the example personal shopping system in accordance with the present disclosure.

In order to finalize the registration process, the personal shopper is provided with a user interface 1300 that will allow the shopper 210 to invite their friends to become clients as will be described later. Upon completing the invitation process, or alternatively upon skipping the process in favor of completing the invitation process later, the shopper 210 is provided with an optional tour of some of the features of the present system 200 as illustrated in FIGS. 14A-14C. In this example, a display 1400 welcome the shopper and teaches the shopper 210 how to use the application features to serve their clients. For example, a display 1410 and a display 1420 introduce the shopper to the catalog feature of the present system, which as described above allows the shopper 210 to create a unique list of products, tailored to their clients' needs and interests. As illustrated the catalog process includes the steps of creating a new catalog; adding products to the catalog, adding product comments to let the client know why the shopper chose the item, and adding the client to the catalog such that they can view the recommendations. As previously noted, the products may be available on the data repository 68A, or alternatively may be available from additional locations, such as other websites, retail locations, etc.

Figure 15:
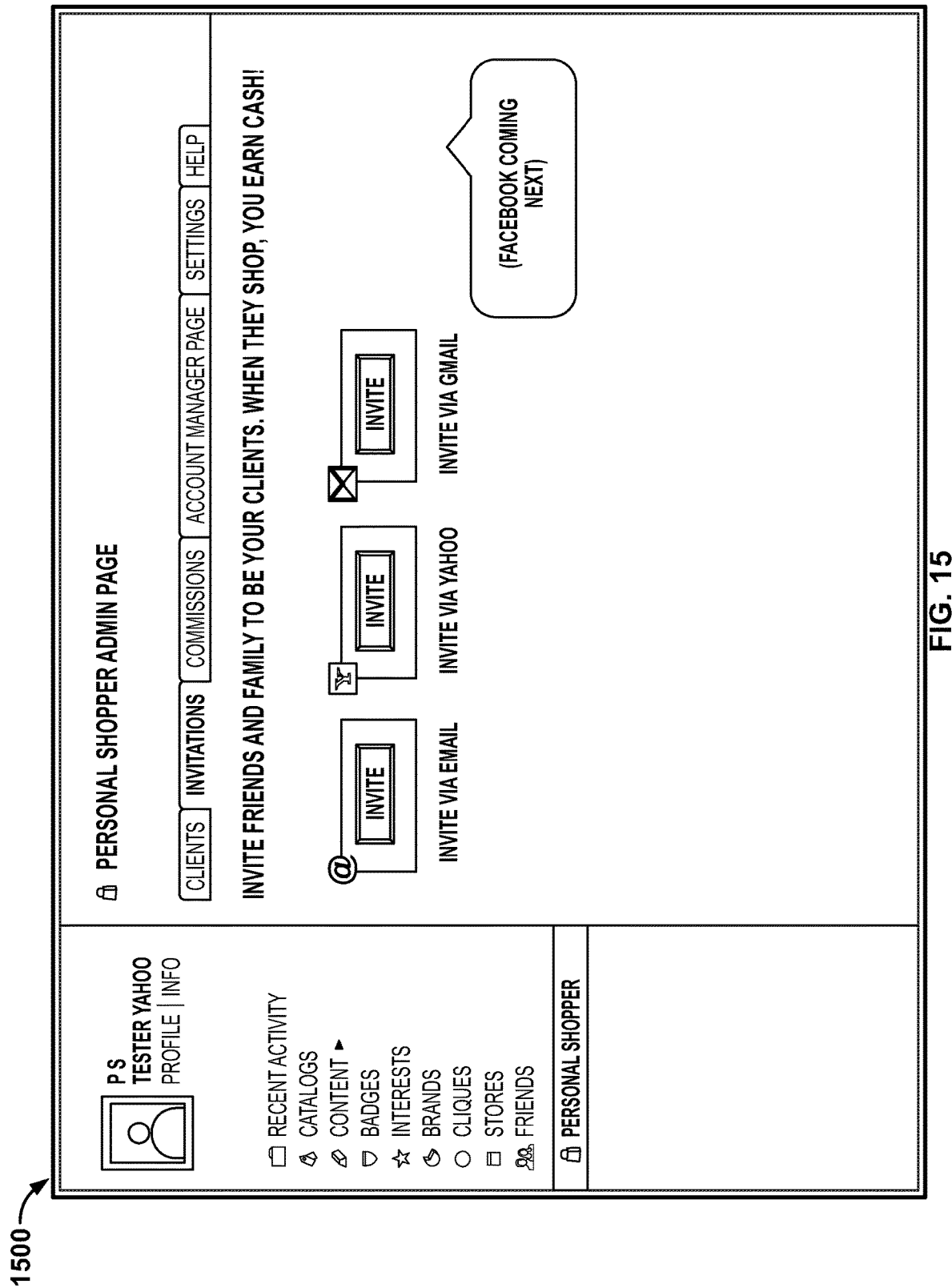
FIG. 15 illustrates an example user interface for administering invitation from the personal shopper to a customer with the example personal shopping system in accordance with the present disclosure.
Figure 18:
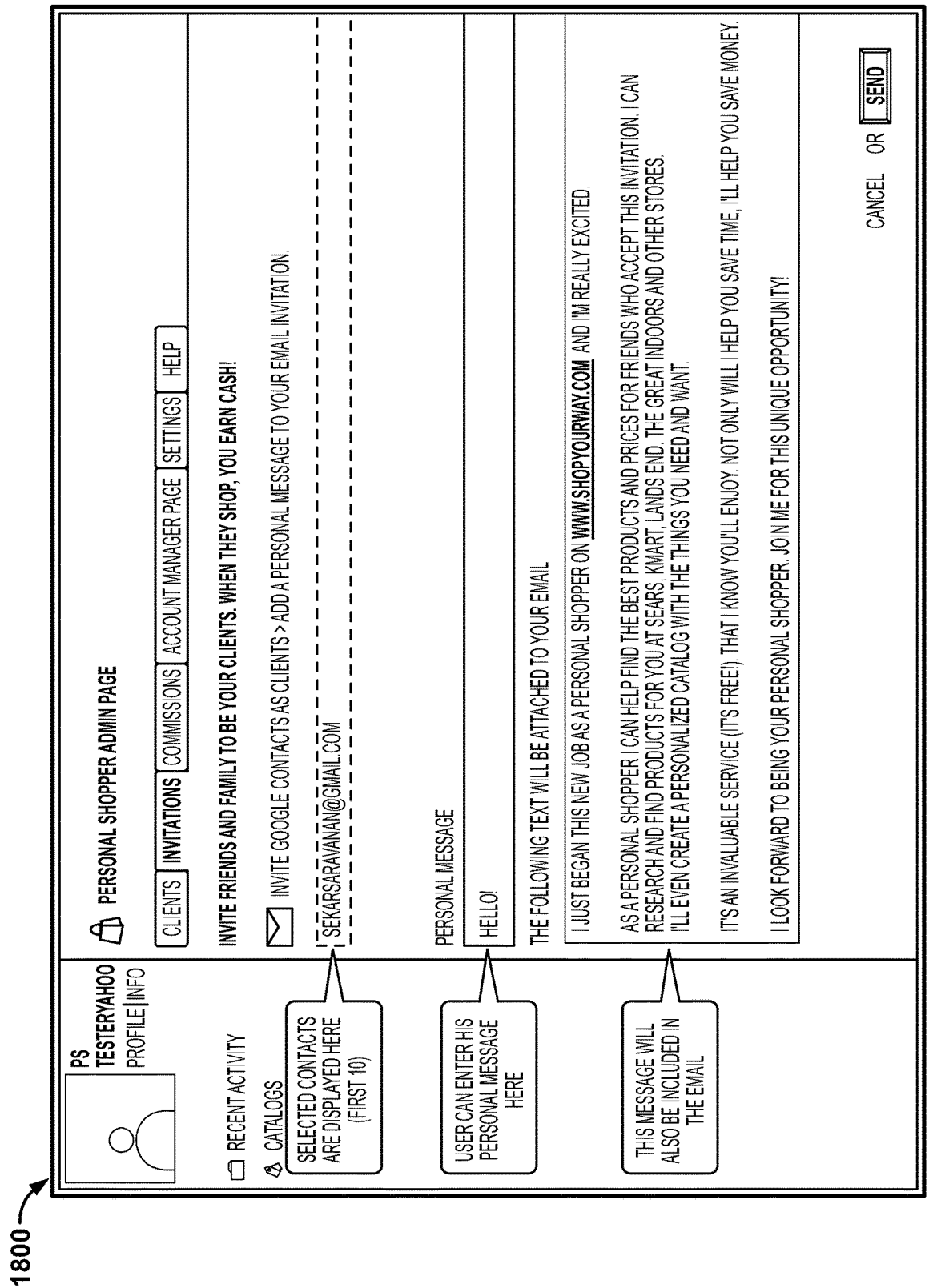
FIG. 18 illustrates an example invitation email that may be utilized to invite an association between the customer and the personal shopper with the example personal shopping system in accordance with the present disclosure.

Upon completion of the tour, the personal shopper 210 is presented with an interface 1500 to begin the invitation process as shown in FIG. 15. In the illustrated example, the user may make invitations via email, yahoo, Gmail, and/or another suitable email and/or social network system. As shown in FIGS. 16A and 16B, the system 200 may import contacts using the industry-standard open authorization (OAuth) interface provided by most email providers. This authorization requires the shopper to sign into their email account at interface 1600, and to authorize personal access to the email account in interface 1610. Once the proper authorizations are granted, the contact are imported and displayed to the personal shopper 210 for inclusion in an invite, such as illustrated by the interface 1700 in FIG. 17.

Figure 19:
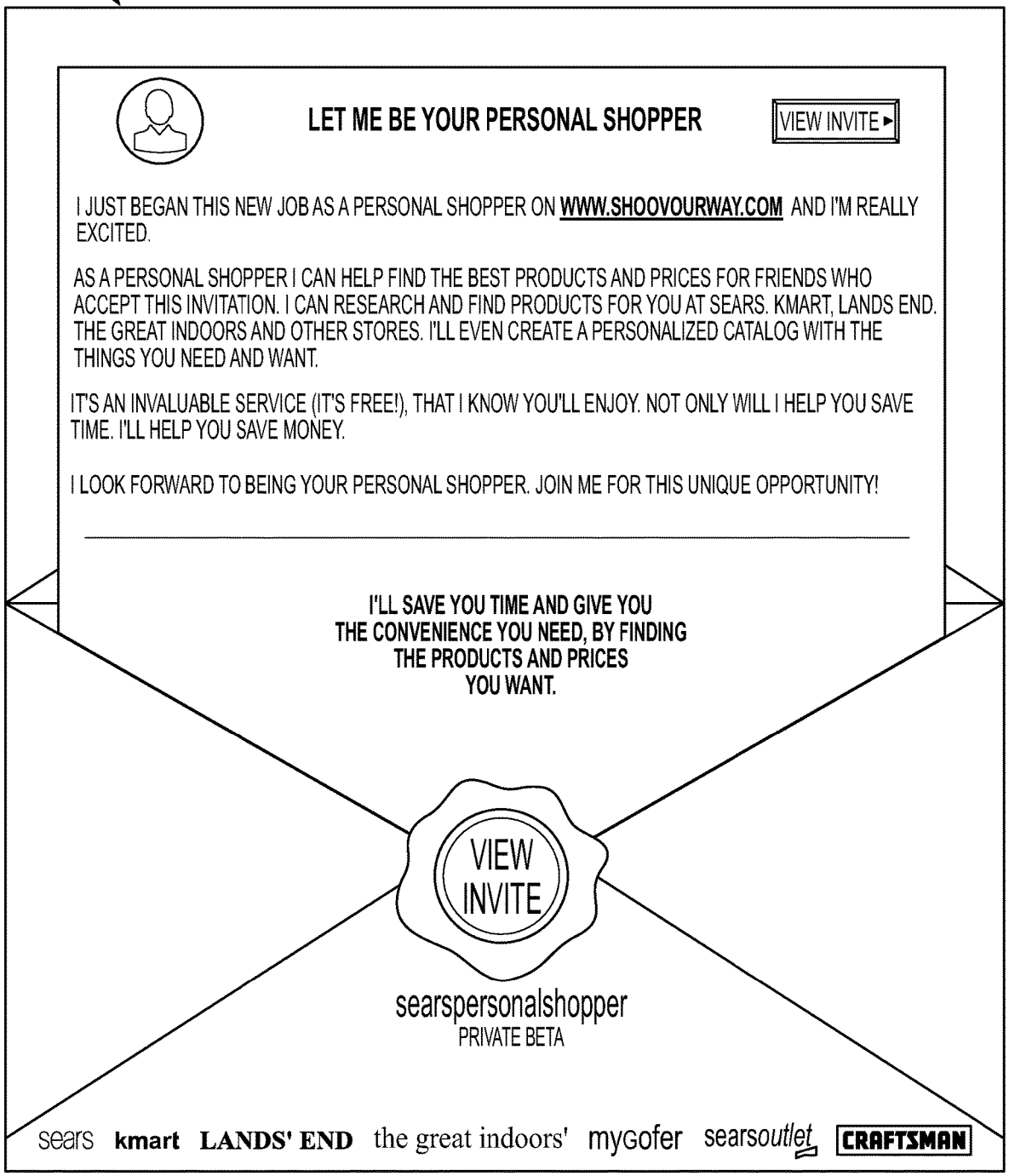
FIG. 19 illustrates an example user interface for displaying an invitation to become a customer in accordance with the present disclosure.

As the list of invitees is finalized, an editable, template email 1800 may be displayed to the personal shopper 210 for inviting clients to join their network. As noted, the email 1800 may display the selected contacts and allow the shopper 210 to edit and personalize their email message. The email will provide instructions to the customer 220 to join the specific personal shopper's network. An example invite email 1900 as received by the customer 220 is illustrated in FIG. 19.

Figure 20:
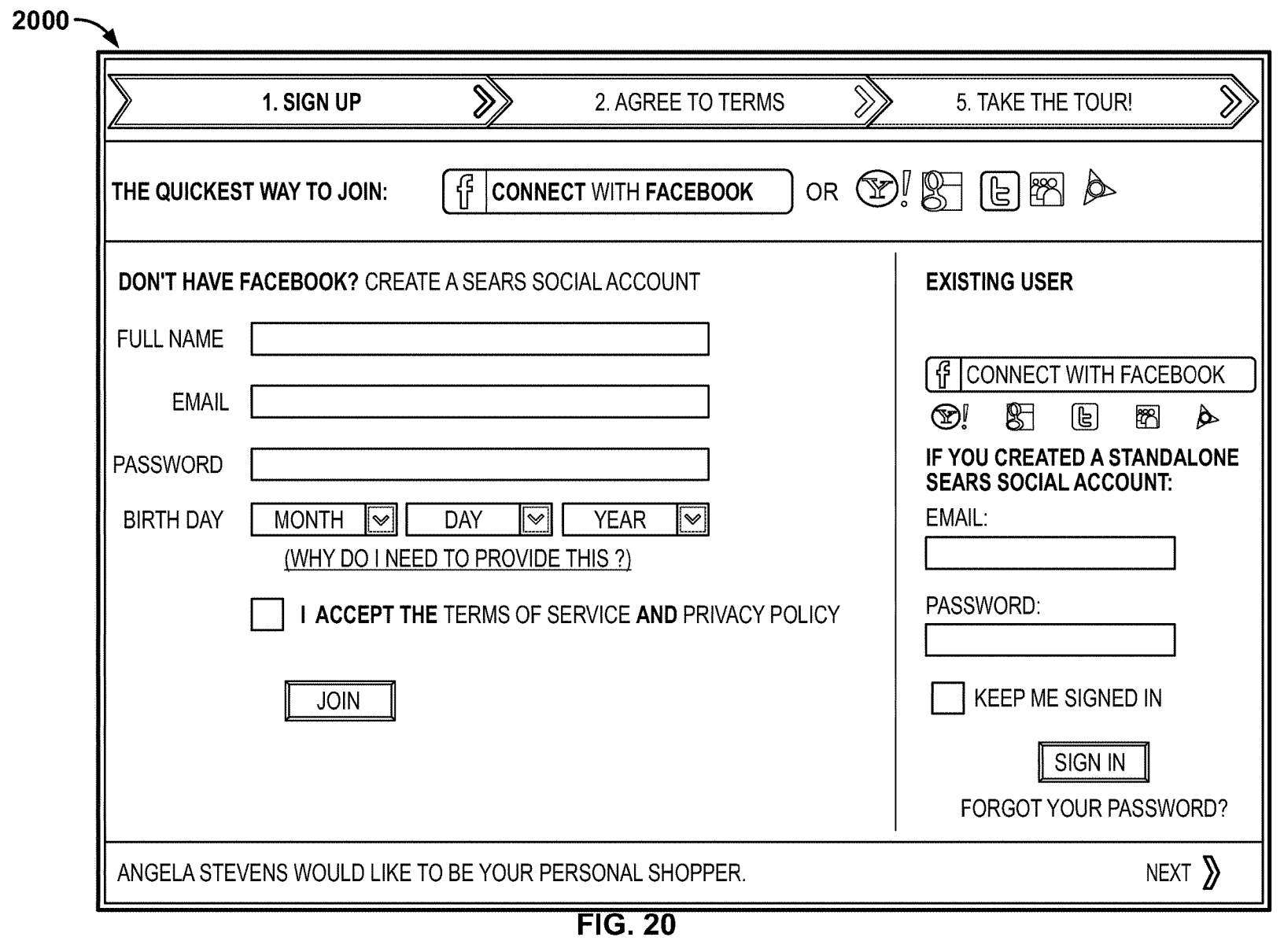

For registering and configuring the customer 220 to have a relationship with their personal shopper 210, FIGS. 20-21. Similar to the registration process of the personal shopper 210, the customer 220 provides the system 200 with login information at a user interface 2000 and similarly agrees to the terms and conditions as desired at a user interface 2100. While not illustrated in the current application, it will be understood by one of ordinary skill in the art that the consumer 220 may also take a tour of the system 200 similar to the tour taken by the personal shopper 210.

Figure 23:
FIG. 23 illustrates an example user interface displaying information relevant to the interests of a customer.

To provide a user interface to manage and service the customers 220, the system 200 provides for a series of example user interfaces as illustrated in FIGS. 22-27. For instance, FIG. 22 provides for a user interface 2200 that allows a personal shopper 210 to view each of their registered customers 220 (e.g., clients). The interface 2200 may provide for an overview of the client's activity as well as a link to the client's page and/or retail associate 230. Once a specific client is selected, the system 200 may display information regarding the client (e.g., a profile), including, for instance, the client's interests at an interface 2300, as illustrated in FIG. 23. It will be appreciated that the interests and/or history may be provided by the client and/or culled from the client's online and/or offline activity through various data-mining techniques.

Figure 24:
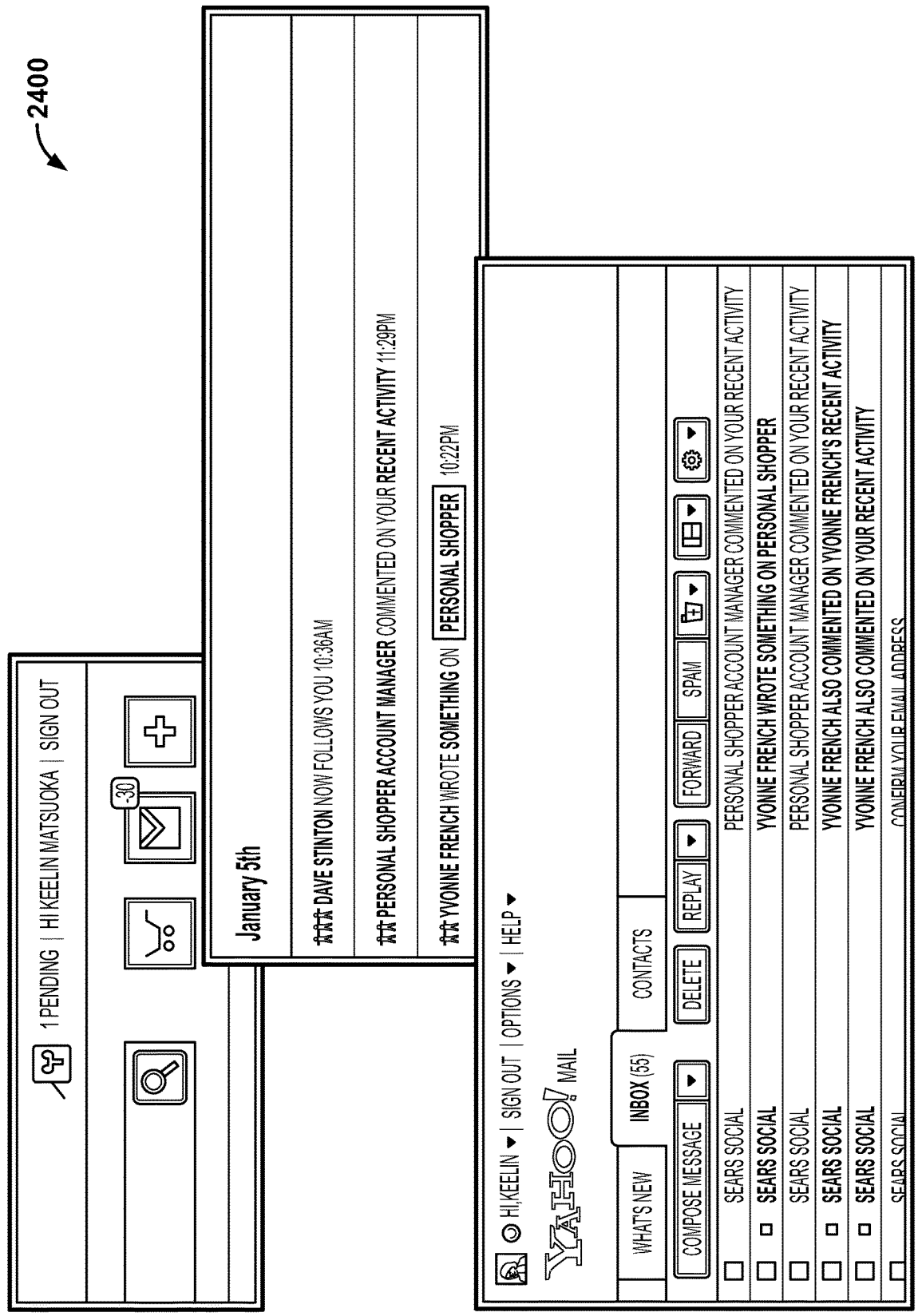
FIG. 24 illustrates an example user interface to display communication information between a customer and a personal shopper.

Additionally, to allow contact with the client, a user interface 2400 may be provided as illustrated in FIG. 24. The example interface 2400 provides email communications through a push or pull paradigm, and furthermore allows video, text, chat, voice, messaging as desired. The interface 2400 may further prove status updates to allow the personal shopper 210 the ability to track application usage by their customer 220.

Figure 25:
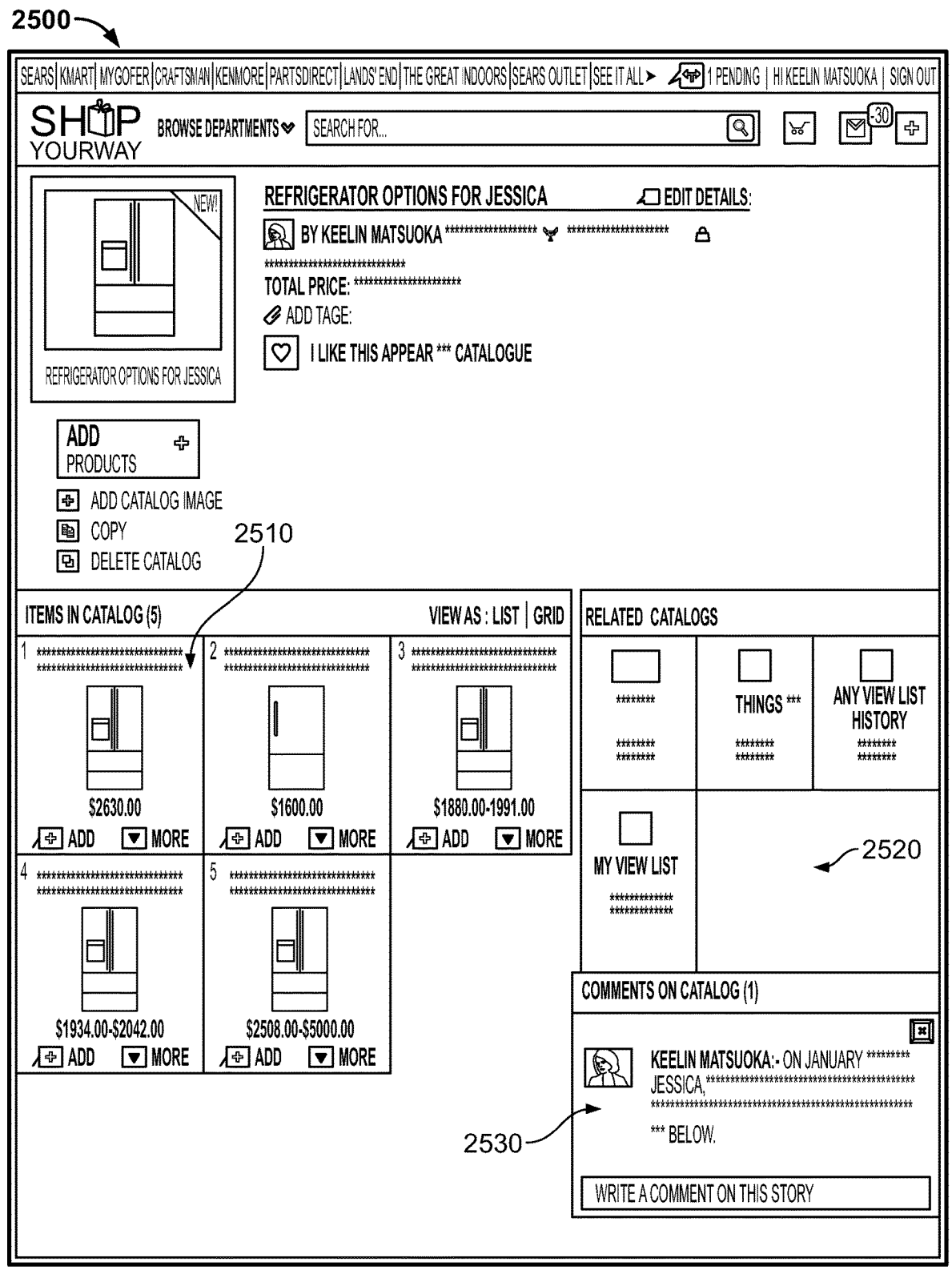
FIG. 25 illustrates an example user interface to create and display a personalized catalog for a customer.

As previously noted, the system 200 allows a personal shopper 210 the ability to create personal catalogs and/or shopping lists for each of their customers 220. As illustrated in FIG. 25, a user interface 2500 includes an example catalog for a customer 220. In this example, the personal shopper has identified that their client desires a refrigerator, and accordingly, the personal shopper 210 has identified five possible refrigerators in the catalog as shown in an interface 2510. By selecting one of the refrigerators in the catalog, additional information regarding the product may be shown in the interface 2500. The system 200 may also provide a link to related catalogs at an interface 2520, and/or allow the personal shopper 210, the customer 220, and/or other the ability to comment on the catalog at an interface 2530. It will be appreciated by one of ordinary skill in the art the while the catalog page is directed to a refrigerator, the catalog may be any suitable related and/or unrelated set of products and/or services as desired.

Figure 26:
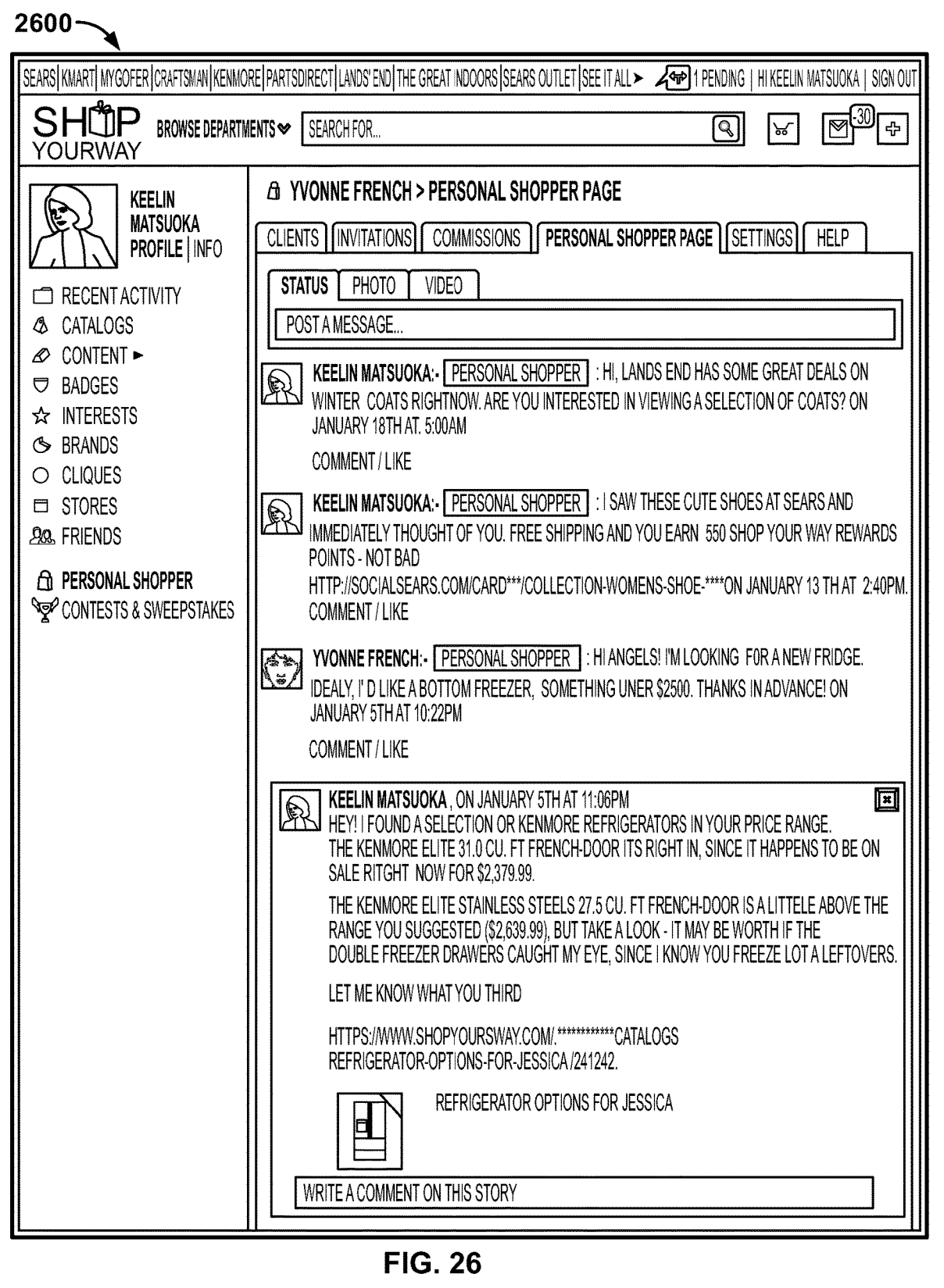
Figure 27A:
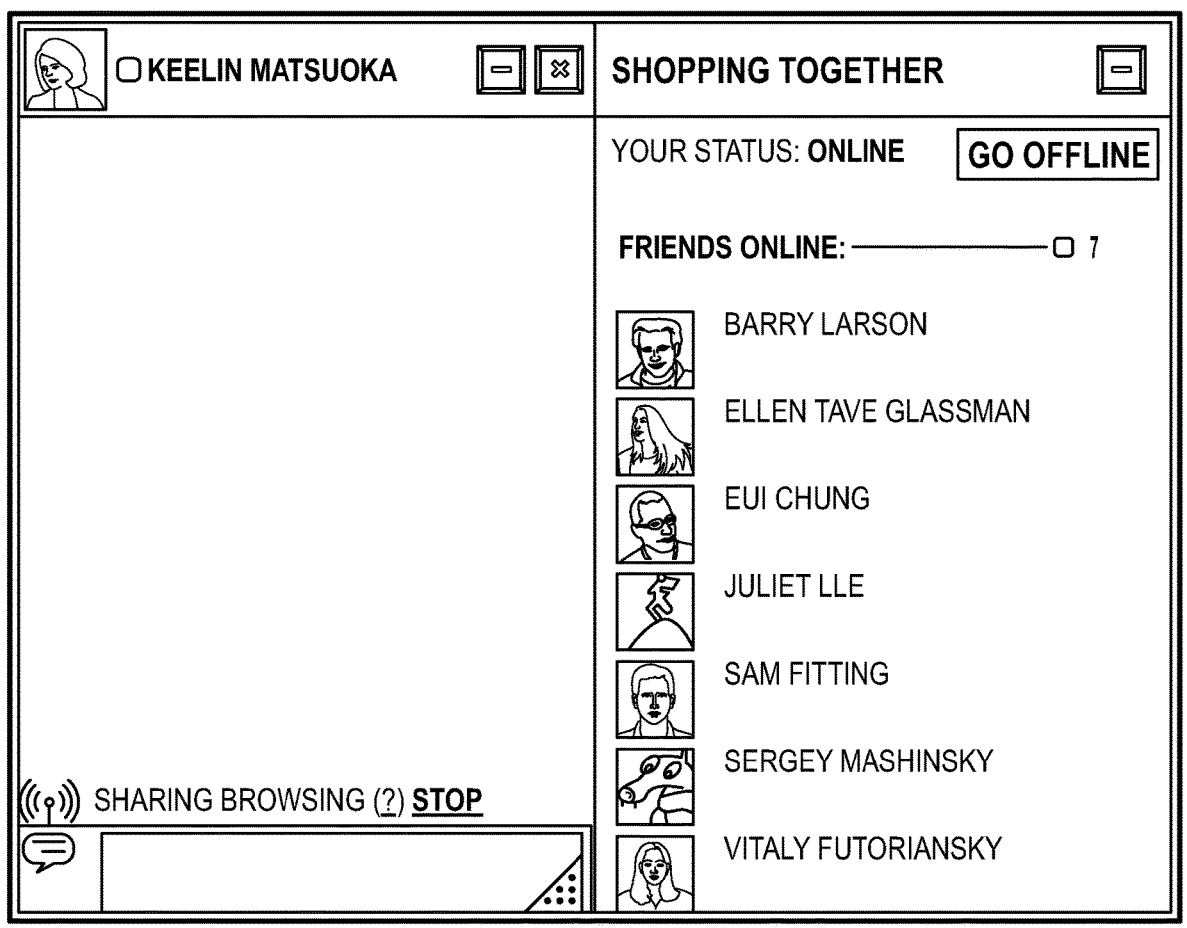
FIG. 27A illustrates an example user interface to display a communication session between a customer and a personal shopper.
Figure 27B:
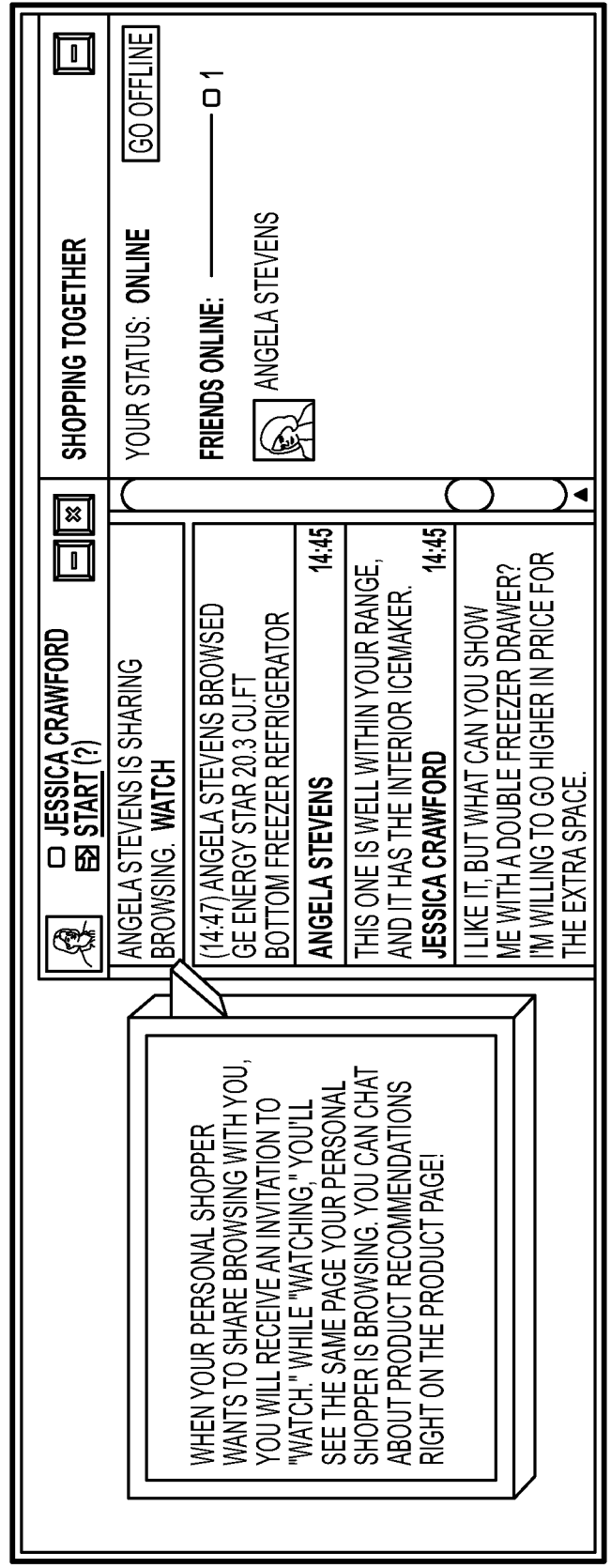
FIG. 27B illustrates an example user interface to display a communication session between a customer and a personal shopper.
Figure 28:
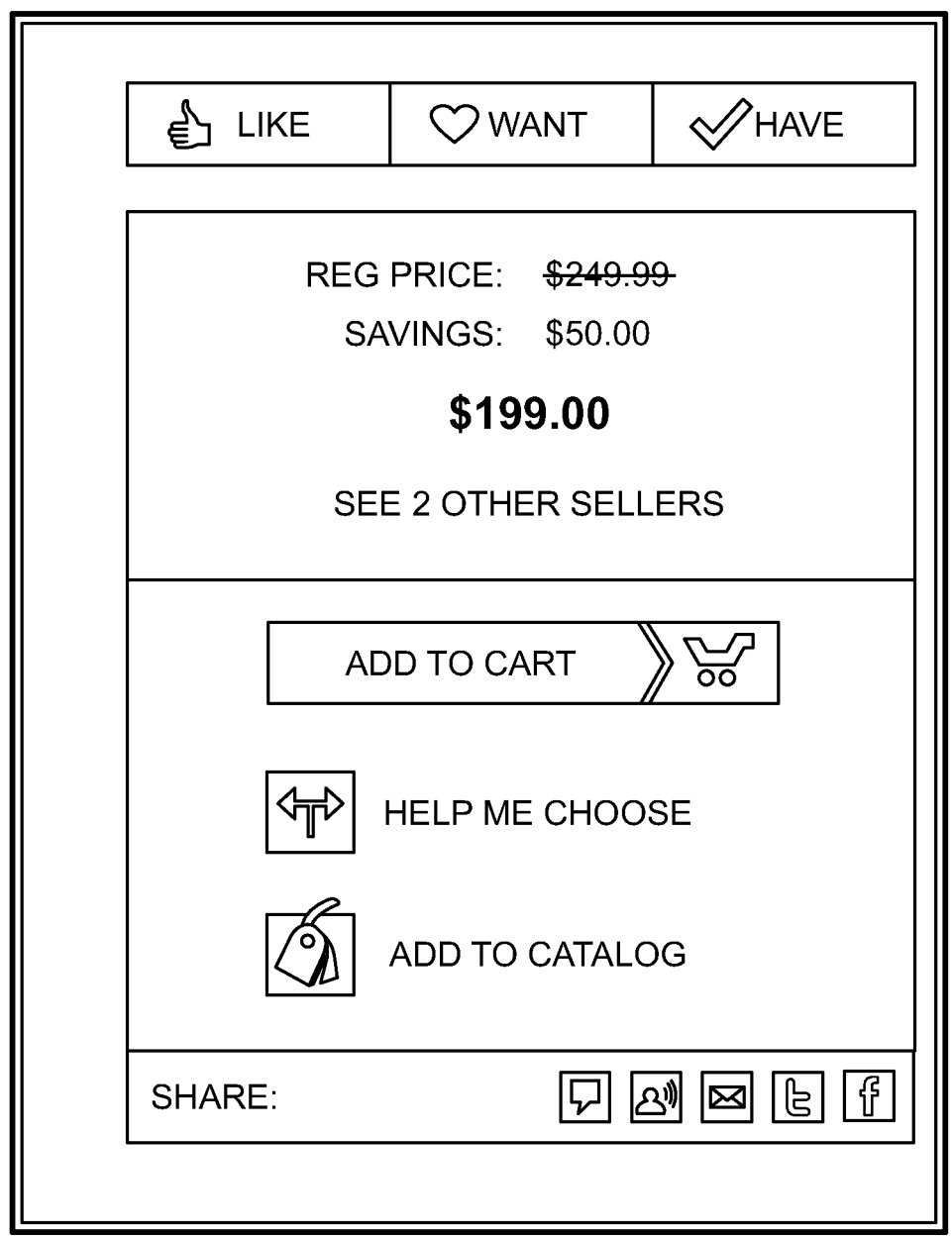
FIG. 28 illustrates an example user interface to display a product added to a personal catalog.
Figure 29:
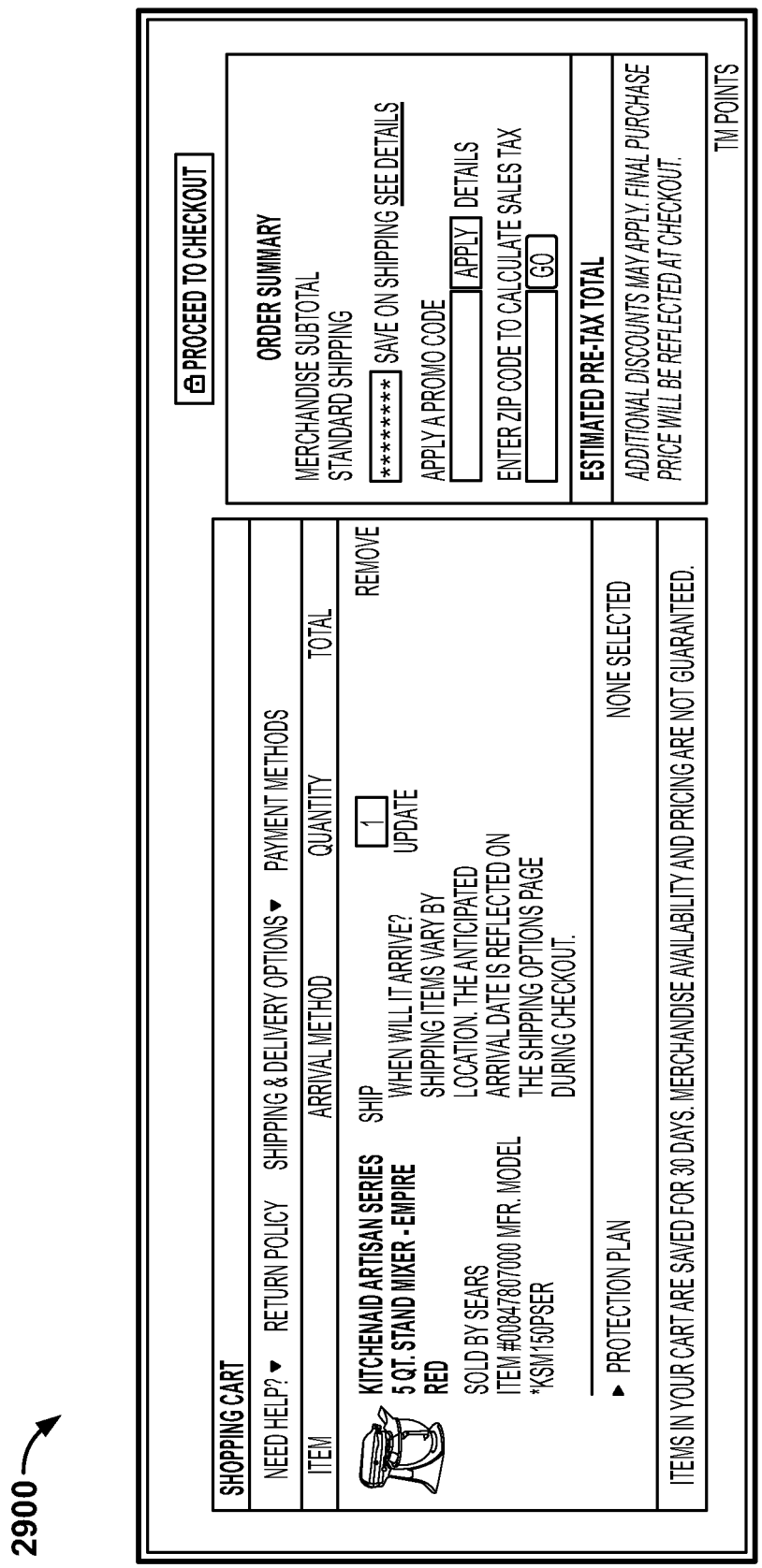
FIG. 29 illustrates an example user interface to display an example checkout of a product by a customer.

As shown in FIG. 26, meanwhile, to provide the personal shopper 210 and the customer 220 the ability to chat, email, and/or otherwise discuss areas of interest, the system 200 may be provided with a user interface 2600. As shown, the interface 2600 allows the personal shopper 210 and the customer 220 the ability to post comments, links, share information, ideas, etc. as desired. As can be seen, this allows a personal shopper 210 to understand and respond to the customer's needs in a logical and expedited manner. For instance, as illustrated in FIGS. 27A and 27B, a user interface 2700 displays the inline/offline status of the customers 220. The personal shopper can chat with the customer, share browsing through either a computer and/or mobile device. When the personal shopper 210 shares browsing with the customer 220, both parties must agree to allow the other to watch the session for privacy reasons. While sharing browsing, the client and shopper will both see the same Internet/shopping page and both parties can chat about what they are viewing and make recommendations, comments, suggestions, etc. Additionally, as illustrated in FIG. 28, a user interface 2800 may provide the personal shopper 210 with detailed information regarding the customer's likes, wants, and/or must haves to better provide service to that customer.

To provide the ability to complete a purchase, the system 200 may provide a user interface 2900 such as, for example, a traditional shopping-cart checkout model. While not provided on the example interface 2900, the checkout confirmation interface 2900 may include information regarding the relationship between the customer 220 and the personal shopper 210, as well as a summary of nay rewards (e.g., points) due to the customer 220 for completing the purchase.

Upon purchase by the customer 220, the system 200 may be capable of displaying an interface 3000 to the personal shopper 210 including a summary of each of the qualified purchases associated with the personal shopper 210, such as illustrated in FIG. 30. In the example interface, the personal shopper 210 is presented with a listing of each qualified purchase including the client name, the order date, the order amount, the commission calculation, and the commission amount, for example. In at least some examples, at least one of the list fields is selectable to provide the personal shopper 210 with additional information regarding the transaction.

Figure 31:
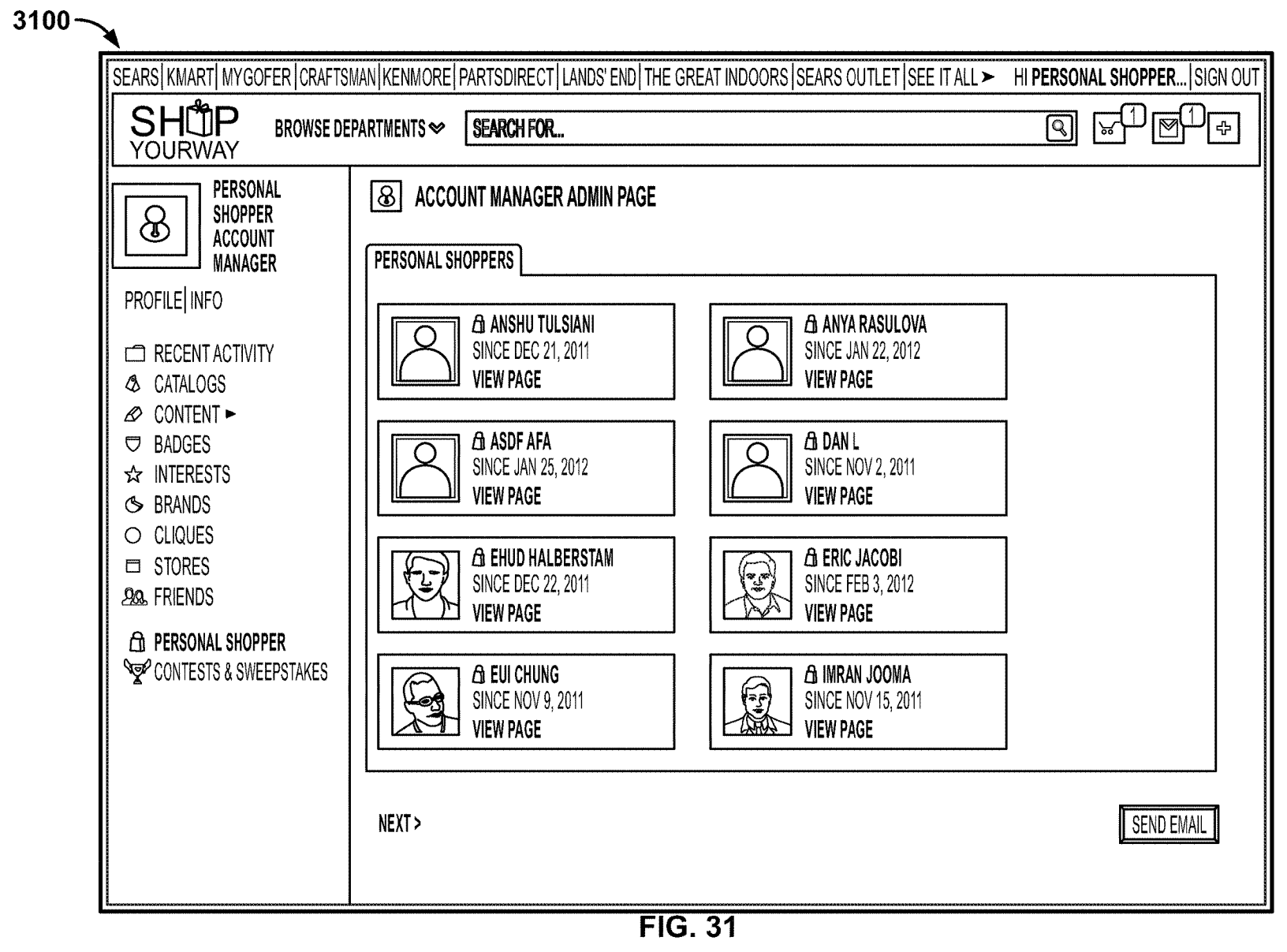
Figure 32:
FIG. 32 illustrates an example user interface to display a communication session between an account manager and a personal shopper.
Figure 33:
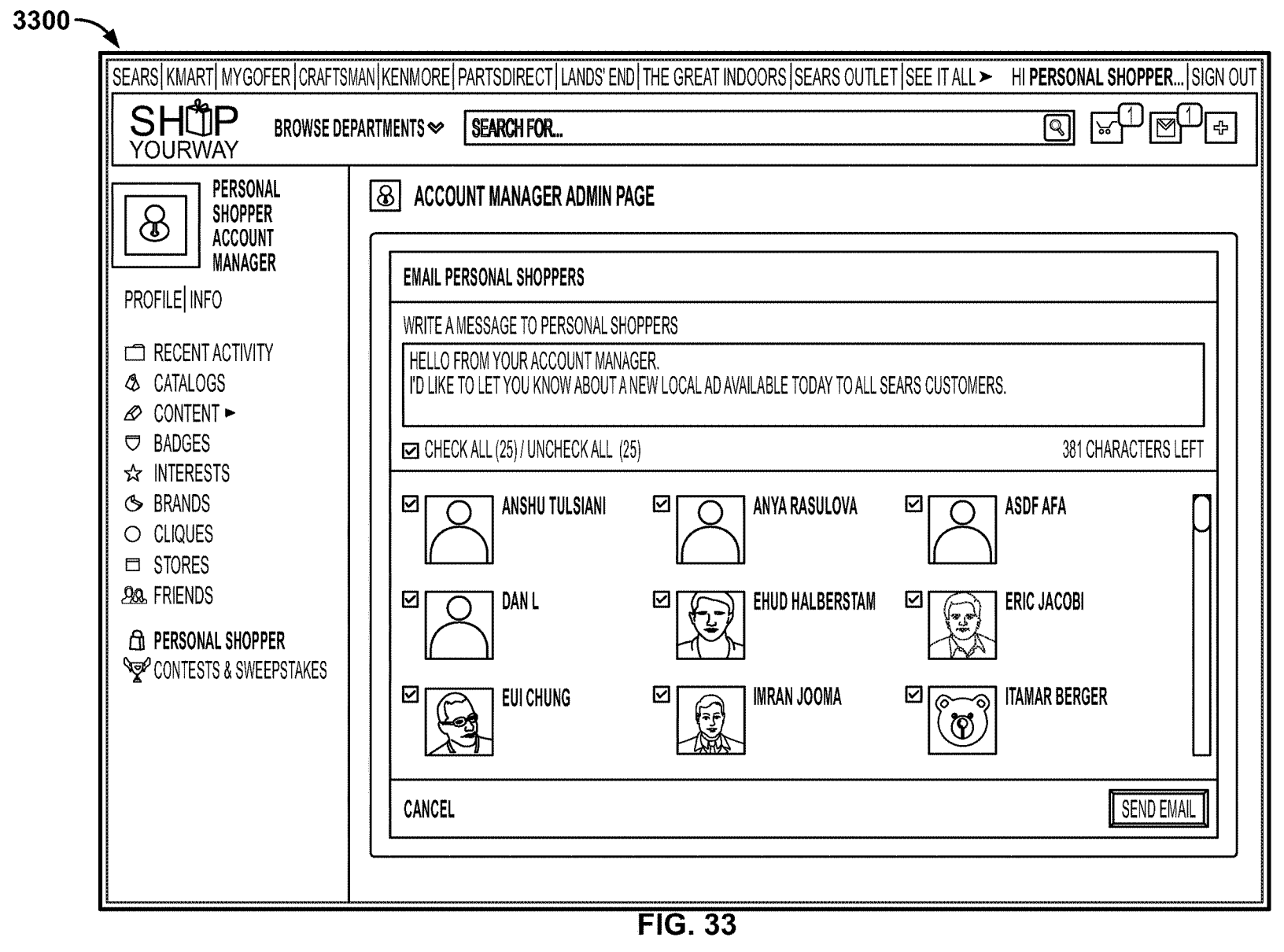

In order to provide the account manager 230 with oversight of the personal shopping experience, the system 200 may provide the account manager with a similar set of interfaces as the personal shopper 210 and the customer 220. For example, as illustrated in FIGS. 31-33, the account manager may be provided with an interface 3100 listing the personal shoppers 210 that the account manager supports. Each of the listed entries in the interface 3100 may be selected to provide the account manager 230 additional information regarding the personal shoppers profile and/or performance.

For example, to provide support to the personal shopper 210, the interface 3200 may allow a conversation to take place between the account manager 230 and the personal shopper 210 as is known in the art. In this example, the interface 3200 provides a traditional chat mechanism to receive, send, and/or answer question to/from the personal shopper 210. Finally, as illustrated in FIG. 33, the system 200 allows the account manager the ability to email all of their personal shoppers 210 at once, providing the ability to disseminate pertinent information to multiple recipients as necessary.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A method, comprising:
   hosting a database of information regarding a customer;
   hosting a database of information regarding a personal shopper;
   tracking a performance of the personal shopper;
   associating the customer with the personal shopper based on a location, shopping interests, and the tracked performance of the personal shopper;
   causing a graphical user interface to provide the personal shopper with an ability to request to be the personal shopper for the customer via a selection of one or more graphical elements of the graphical user interface;
   causing, via a selection of one or more graphical elements of the graphical user interface, a catalog to be created, wherein the catalog comprises one or both of a recommended product and a recommended service, one or both of a product offering and a service offering customized for the customer, and one or more comments by the personal shopper providing reasons for including the particular product or service offerings in the catalog;
   causing the graphical user interface to provide the personal shopper with a plurality of different graphical user interfaces that can be selected, via a selection of one or more graphical elements of the graphical user interface, to create a customized graphical user interface for the customer;
   receiving an indication of a purchase of the recommended product sold or service provided; and
   providing a reward to the personal shopper based upon the purchased product or service.

2. The method according to claim 1, comprising:
   determining a personalized catalog of products including the recommended product or service; and
   tracking both online and offline activities of the customer.

3. The method according to claim 1, wherein the reward is a commission based on the sale price of the recommended product or service.

4. The method according to claim 1, wherein associating the customer with the personal shopper comprises determining a relationship between the customer and the personal shopper, and wherein the customer initiates the association of the customer with the personal shopper.

5. The method according to claim 1, wherein associating the customer with the personal shopper comprises determining a relationship between the customer and the personal shopper, wherein the relationship comprises one or more social media connections, and wherein the personal shopper initiates the association of the customer with the personal shopper.

6. The method according to claim 5, wherein the one or more social media connections are determined via a query of a social media application.

7. The method according to claim 1, comprising hosting a database of information related to a plurality of products or services, wherein the one or both of the recommended product and the recommended service are selected from the plurality of products and services, and wherein the one or both of the recommended product and the recommended service are a proactive recommendation by the personal shopper.

8. The method according to claim 7, wherein the database of information related to a plurality of products or services is hosted by a retail establishment.

9. The method according to claim 1, further comprising hosting a database of information regarding an account manager and associating the personal shopper with the account manager.

10. The method according to claim 1, comprising providing a user interface comprising graphical user interface elements adapted for display on a computing device to enable the customer and the personal shopper to discuss the recommended product or service.

11. The method according to claim 10, wherein the user interface enables the customer and the personal shopper to discuss the recommended product or service via one or more of an audio communication, a text communication, an email, a text chat, and a video communication.

12. The method according to claim 11, wherein the user interface enables the customer and the personal shopper to share web browsing between the customer and the personal shopper.

13. The method according to claim 1, wherein at least one customer is associated with the personal shopper as a reward for performance by the personal shopper.

14. The method according to claim 1, further comprising providing a user interface having graphical user interface elements adapted for display on a computing device to enable the personal shopper to communicate directly with at least one of the plurality of customers.

15. The method according to claim 1, comprising providing a user interface that comprises graphical user interface elements adapted for display on a computing device to display personal information of the customer.

16. The method according to claim 15, wherein the personal information of the customer is provided via data mining.

17. The method according to claim 1, wherein the customer can be associated with a plurality of personal shoppers.

18. The method according to claim 1, wherein, as part of a registration process of the personal shopper, the personal shopper is provided with an ability, via a graphical user interface, to cull an established contact list to associate the customer with the personal shopper.

19. The method according to claim 1, wherein associating the customer with the personal shopper is performed after authorization by both the customer and the personal shopper.

20. The method according to claim 1, comprising:
associating each of a plurality of personal shoppers with at least one customer; and
hosting a database indicative of the rewards to each of the personal shoppers.

21. The method according to claim 1, comprising:
causing a graphical user interface that, via a selection of one or more graphical elements of the graphical user interface, to enable access to an online personal shopper account via an online social network account, wherein the online personal shopper account and the online social network account are different.

* * * * *